US012770959B2

(12) United States Patent
Du et al.

(10) Patent No.: US 12,770,959 B2
(45) Date of Patent: Oct. 20, 2026

(54) INTERNALLY HEATABLE BATTERY, INTERNALLY HEATABLE BATTERY SYSTEM, INTERNALLY HEATABLE BATTERY METHOD, AND ELECTRIC VEHICLE COMPRISING THE SAME

(71) Applicant: Ampcera Inc., Milpitas, CA (US)

(72) Inventors: Hui Du, Tucson, AZ (US); James Emery Brown, Tucson, AZ (US); Chen Chen, Tucson, AZ (US); Sumin Zhu, San Franscisco, CA (US)

(73) Assignee: Ampcera Inc., Tucson, AZ (US)

( * ) Notice: Subject to any disclaimer, the term of this patent is extended or adjusted under 35 U.S.C. 154(b) by 443 days.

(21) Appl. No.: 17/626,155

(22) PCT Filed: Jul. 13, 2020

(86) PCT No.: PCT/US2020/041798
§ 371 (c)(1),
(2) Date: Jan. 11, 2022

(87) PCT Pub. No.: WO2021/034423
PCT Pub. Date: Feb. 25, 2021

(65) Prior Publication Data

US 2022/0247015 A1 Aug. 4, 2022

Related U.S. Application Data

(60) Provisional application No. 62/953,703, filed on Dec. 26, 2019, provisional application No. 62/873,446, filed on Jul. 12, 2019.

(51) Int. Cl.
*H01M 10/6571* (2014.01)
*H01M 10/615* (2014.01)
(Continued)

(52) U.S. Cl.
CPC ..... *H01M 10/6571* (2015.04); *H01M 10/615* (2015.04); *H01M 10/625* (2015.04); *H01M 10/654* (2015.04); *H01M 2220/20* (2013.01)

(58) Field of Classification Search
CPC ........... H01M 10/6571; H01M 10/615; H01M 10/625; H01M 10/654; H01M 2220/20;
(Continued)

(56) References Cited

U.S. PATENT DOCUMENTS

| | | | |
|---|---|---|---|
| 732,616 | A | 6/1903 | Burgess et al. |
| 1,687,196 | A | 10/1928 | Daellenbach |

(Continued)

FOREIGN PATENT DOCUMENTS

| | | | |
|---|---|---|---|
| CN | 104916848 B | | 9/2017 |
| CN | 108242551 | * | 7/2018 |

(Continued)

OTHER PUBLICATIONS

Anthoney J. Bur, Dielectric properties of polymers at microwave frequencies: a review, Polymer vol. 26, No. 7, 1985, p. 963-977.

(Continued)

*Primary Examiner* — Lisa S Park
(74) *Attorney, Agent, or Firm* — Walters & Wasylyna LLC

(57) ABSTRACT

The battery may include: an anode; a cathode; an electrolyte; at least one inductively heatable material or dielectrically heatable material in the electrolyte. Alternatively, the battery may include: an anode; a cathode; a solid electrolyte; at least one resistively heatable material in the solid electrolyte; and an electrically, ionically, or electrically and ionically insulative coating on the at least one resistively heatable material.

17 Claims, 15 Drawing Sheets

(51) Int. Cl.
*H01M 10/625* (2014.01)
*H01M 10/654* (2014.01)

(58) Field of Classification Search
CPC ....... H01M 2300/0082; H01M 10/653; H01M 10/657; H01M 50/213; H01M 50/249; H01M 10/0525
See application file for complete search history.

(56) References Cited

U.S. PATENT DOCUMENTS

| | | | | |
|---|---|---|---|---|
| 2,418,792 | A | 4/1947 | Coleman | |
| 2,442,380 | A | 6/1948 | Schrodt et al. | |
| 2,516,048 | A | 7/1950 | Endress | |
| 2,615,933 | A | 10/1952 | Carlson et al. | |
| 2,626,971 | A | 1/1953 | Percival | |
| 2,700,064 | A | 1/1955 | Akerman | |
| 2,710,937 | A | 6/1955 | Godshalk et al. | |
| 2,761,006 | A | 8/1956 | Kramer | |
| 2,938,066 | A | 5/1960 | Helmut | |
| 3,623,471 | A | 11/1971 | Bogue et al. | |
| 3,723,187 | A | 3/1973 | Toydoka et al. | |
| 3,774,589 | A | 11/1973 | Kober | |
| 4,025,861 | A | 5/1977 | Godard et al. | |
| 4,095,938 | A | 6/1978 | Mikaila | |
| 5,039,927 | A | 8/1991 | Centafanti | |
| 5,281,792 | A | 1/1994 | Lee et al. | |
| 5,362,942 | A | 11/1994 | Vanderslice, Jr. et al. | |
| 5,378,879 | A | 1/1995 | Monovoukas | |
| 5,599,636 | A | 2/1997 | Braun | |
| 5,948,298 | A | 9/1999 | Ijaz | |
| 6,002,240 | A | 12/1999 | McMahan et al. | |
| 6,096,456 | A | 8/2000 | Takeuchi et al. | |
| 6,392,388 | B1 | 5/2002 | Young | |
| 6,575,156 | B2 | 6/2003 | MacFarlane et al. | |
| 6,882,061 | B1 | 4/2005 | Ashtiani et al. | |
| 7,264,902 | B2 | 9/2007 | Horie et al. | |
| 7,947,925 | B2 | 5/2011 | Suzuki et al. | |
| 8,574,738 | B2 | 11/2013 | Fattig | |
| 8,791,397 | B2 | 7/2014 | Kim et al. | |
| 8,852,772 | B2 | 10/2014 | McDonald | |
| 9,083,065 | B2 | 7/2015 | Carkner | |
| 9,214,703 | B2 | 12/2015 | Ikeda | |
| 9,337,671 | B2 | 5/2016 | Komori et al. | |
| 10,084,201 | B2 | 9/2018 | Hatta et al. | |
| 10,147,950 | B2 | 12/2018 | Sakshaug et al. | |
| 10,181,599 | B2 | 1/2019 | Allison et al. | |
| 10,340,504 | B2 | 7/2019 | Englert | |
| 2004/0241520 | A1 | 12/2004 | Ha et al. | |
| 2008/0292964 | A1 | 11/2008 | Takeuchi et al. | |
| 2009/0087723 | A1 | 4/2009 | Inda | |
| 2010/0323264 | A1* | 12/2010 | Chiang | H01M 8/0438 429/449 |
| 2011/0059343 | A1 | 3/2011 | Mckinney et al. | |
| 2011/0305941 | A1* | 12/2011 | Park | H01M 50/423 427/121 |
| 2012/0107665 | A1 | 5/2012 | Abe et al. | |
| 2013/0196243 | A1* | 8/2013 | Braithwaite | H01M 8/249 429/440 |
| 2013/0224632 | A1* | 8/2013 | Roumi | H01M 4/133 29/623.1 |
| 2014/0076876 | A1 | 3/2014 | Papajewski | |
| 2014/0113166 | A1 | 4/2014 | Schneider et al. | |
| 2015/0037698 | A1 | 2/2015 | Buzon et al. | |
| 2015/0064534 | A1 | 3/2015 | Lohmann et al. | |
| 2016/0059733 | A1 | 3/2016 | Hettrich et al. | |
| 2016/0126521 | A1* | 5/2016 | Suonsivu | H01M 50/449 429/246 |
| 2016/0200011 | A1* | 7/2016 | Rothfuss | C04B 35/64 264/494 |
| 2016/0204408 | A1* | 7/2016 | Herle | H01M 4/405 429/143 |
| 2017/0085107 | A1 | 3/2017 | Rastegar et al. | |
| 2018/0108956 | A1* | 4/2018 | Fortenbacher | H01M 10/654 |
| 2018/0141458 | A1* | 5/2018 | Jammoul | H01M 10/63 |
| 2018/0358829 | A1* | 12/2018 | Rastegar | H01G 11/14 |
| 2019/0074559 | A1 | 3/2019 | Demund et al. | |
| 2019/0081371 | A1 | 3/2019 | Bauer et al. | |
| 2019/0386357 | A1 | 12/2019 | McHugh et al. | |
| 2020/0176835 | A1 | 6/2020 | Rastegar et al. | |
| 2020/0212401 | A1 | 7/2020 | Huang et al. | |
| 2020/0303729 | A1 | 9/2020 | Kim | |
| 2020/0381935 | A1* | 12/2020 | Shimada | H01M 10/486 |
| 2021/0175537 | A1 | 6/2021 | Shin et al. | |

FOREIGN PATENT DOCUMENTS

| | | | |
|---|---|---|---|
| DE | 102007052147 | A1 | 5/2009 |
| DE | 102008015621 | A1 | 10/2009 |
| DE | 102011002729 | A1 | 7/2012 |
| DE | 102011108196 | A1 | 1/2013 |
| DE | 102012210032 | A1 | 12/2013 |
| DE | 102012210091 | A1 | 12/2013 |
| DE | 102012210146 | A1 | 12/2013 |
| DE | 102013221747 | A1 | 4/2015 |
| DE | 102013021255 | A1 | 6/2015 |
| DE | 102016208064 | A1 | 11/2017 |
| DE | 102016213159 | A1 | 1/2018 |
| DE | 102016214337 | A1 | 2/2018 |
| DE | 102017212275 | A1 | 1/2019 |
| DE | 102017130559 | A1 | 6/2019 |
| DE | 102018210417 | A1 | 1/2020 |
| DE | 102018123910 | A1 | 4/2020 |
| DE | 102019214648 | A1 | 3/2021 |
| EP | 2827427 | A1 | 1/2015 |
| JP | 2003197277 | A | 9/2006 |
| JP | 2007227209 | A | 9/2007 |
| JP | 4139199 | B2 | 8/2008 |
| JP | 2004178950 | A | 8/2008 |
| JP | 2010160932 | A | 7/2010 |
| JP | 5649594 | B2 | 1/2015 |
| JP | 2013149414 | A | 1/2015 |
| JP | 6361322 | B2 | 7/2018 |
| JP | 6455538 | B2 | 1/2019 |
| JP | 6463570 | B1 | 2/2019 |
| KR | 20110020666 | A | 3/2011 |
| KR | 20130130292 | A | 12/2013 |
| KR | 20150037242 | A | 4/2015 |
| KR | 101721916 | B1 | 3/2017 |
| KR | 101793311 | B1 | 11/2017 |
| KR | 101816948 | B1 | 1/2018 |
| KR | 102016122 | B1 | 10/2019 |
| KR | 102042755 | B1 | 11/2019 |
| WO | WO8909497 | * | 10/1989 |

OTHER PUBLICATIONS

Sophie Laurent et al., Superparamagnetic iron oxide nanoparticles: promises for diagnosis and treatment of cancer, International Journal of Molecular Epidemiology and Genetics, 2011; vol. 2, No. 4, p. 367-390.
Stanley Zinn, Coil design and fabrication: Basic Design and Modifications, Oct. 1988, vol. 20, Issue 6, United States.
Thomas Bayerl, Induction Heating of Thermoplastic Materials by Particulate Heating Promoters, Polymers & Polymer Composites, vol. 20, No. 4, 2012, p. 333-341.
Xiao-Guang Yang, Asymmetric Temperature Modulation for Extreme Fast Charging of Lithium-Ion Batteries, Joule vol. 3, No. 12, 2019, p. 3002-3019.
Yi Zhang et al., Magnetic Induction Heating of Nano-sized Ferrite Particles, Advances in Induction and Microwave Heating of Mineral and Organic Materials, 2011, p. 484-500, Chapter 21, edited by Stanislaw Grundas.
Xiao-Guang Yang et al., Fast charging of lithium-ion batteries at all temperatures, PNAS, Jul. 10, 2018.

* cited by examiner

INTERNALLY HEATABLE BATTERY, INTERNALLY HEATABLE BATTERY SYSTEM, INTERNALLY HEATABLE BATTERY METHOD, AND ELECTRIC VEHICLE COMPRISING THE SAME

PRIORITY

The present invention is a U.S. national stage entry under 35 U.S.C. § 371 of Intl. Pat. App. No. PCT/US20/41798, filed on Jul. 13, 2020, which claims the priority of U.S. Provisional Patent Application Nos. 62/873,446, filed Jul. 12, 2019, and 62/953,703, filed Dec. 26, 2019, which are incorporated herein by reference in their entireties.

FIELD

The present disclosure relates to the field of systems and methods for internal heating of battery electrolytes, particularly wherein the battery is used to power electric vehicles.

BACKGROUND

Electric vehicle batteries may not perform efficiently due to an insufficient ionic conductivity of the electrolyte, making fast charging and acceleration problematic. This is particularly true for solid electrolytes in extreme cold and harsh climates where the solid-state batteries may cease to function all together. To avoid the above-identified temperature related issues, an electrolyte may be heated to raise the temperature and thus increase the ionic conductivity. In the related art, it is known to heat a solid electrolyte by positioning a resistive heating element in proximity to the solid electrolyte.

SUMMARY

The present disclosure relates to systems and methods for internal heating of battery electrolytes, in which heat is originated from within the battery. By internal heating of the electrolyte, the ionic conductivity of the electrolyte is increased in an efficient manner. The present disclosure relates to solutions for internal heating of electrolytes, particularly solid electrolytes.

In one embodiment of the present description, an inductively heatable battery includes: an anode; a cathode; an electrolyte; at least one inductively heatable material in the electrolyte.

In one embodiment of the present description, an inductively heatable battery system includes: the inductively heatable battery; and an inductive coil proximate to the inductively heatable battery.

In one embodiment of the present description, a vehicle includes: the inductively heatable battery; and an inductive coil proximate to the inductively heatable battery.

In one embodiment of the present description, an inductively heatable battery method includes: inductively heating the at least one inductively heatable material of the inductively heatable battery.

In one embodiment of the present description, a dielectrically heatable battery includes: an anode; a cathode; an electrolyte; at least one dielectrically heatable material in the electrolyte.

In one embodiment of the present description, a dielectrically heatable battery system includes: the dielectrically heatable battery; and a dielectric heater proximate to the dielectrically heatable battery.

In one embodiment of the present description, a vehicle includes: the dielectrically heatable battery; and a dielectric heater proximate to the dielectrically heatable battery.

In one embodiment of the present description, a dielectrically heatable battery method includes: dielectrically heating the at least one dielectrically heatable material of the dielectrically heatable battery.

In one embodiment of the present description, a resistively heatable battery includes: an anode; a cathode; a solid electrolyte; at least one resistively heatable material in the solid electrolyte; and an electrically, ionically, or electrically and ionically insulative coating on the at least one resistively heatable material.

In one embodiment of the present description, a resistively heatable battery system includes: the resistively heatable battery; and a resistive heater proximate to the resistively heatable battery.

In one embodiment of the present description, a vehicle includes: the resistively heatable battery; and a resistive heater proximate to the resistively heatable battery.

In one embodiment of the present description, a resistively heatable battery method includes: resistively heating the at least one resistively heatable material of the resistively heatable battery.

DETAILED DESCRIPTION

Figure 1:
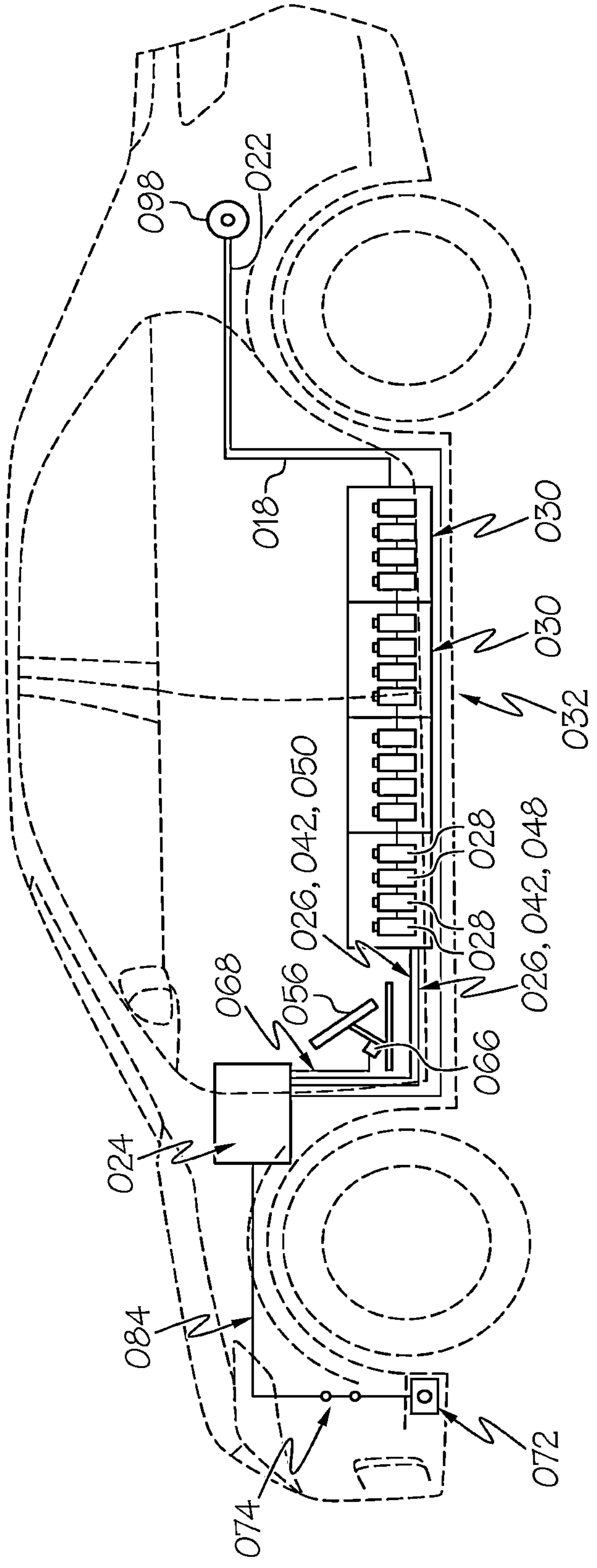
FIG. 1: A schematic illustration of an internal heatable battery system in the form of an electric vehicle having solid-state batteries.

The present disclosure relates to solutions for internal heating of electrolytes, facilitating fast charging and fast usage. This is particularly beneficial in extreme cold and harsh climates where the batteries, particularly solid-state batteries, may have reduced functionality. The present disclosure has particular application wherein a solid-state battery is used to power electric vehicles, wherein the internal heating of the electrolyte may be used to facilitate fast charging, acceleration, and improved cold weather performance of electric vehicles.

One heating strategy may be to heat the battery electrolytes (e.g. solid-state battery electrolytes) by heating components embedded or suspended within its matrix. The embedded or suspended components may be heated using exemplary heating methods such as resistive heating, induction heating, or dielectric heating. These internal heating methods may be used to increase the ionic conductivity of the battery electrolyte (e.g. solid-state battery electrolyte) to enable fast charging and acceleration of an electric vehicle. These internal heating methods may also be used to enable electric vehicle operation in cold weather, in addition to the fast charging and acceleration. The term embedded is used in reference to heatable components disposed in a solid electrolyte. The term suspended is used in reference to heatable components disposed in a liquid electrolyte. The terms embedded and suspended include instances in which the components are partially embedded or suspended within the electrolyte and instances in which the components are fully embedded or fully suspended within the electrolyte. The heatable components may be disposed in the electrolyte near the surface of an electrolyte layer, or the heatable components may be disposed in the electrolyte near the center of the electrolyte layer.

According to the present description, systems and methods for internally heating battery electrolytes (e.g. solid-state battery electrolytes) may include, for example, resistively heatable materials embedded in a solid electrolyte, inductively heatable materials embedded in a solid electrolyte or suspended in a liquid electrolyte, or dielectrically heatable materials embedded in a solid electrolyte or suspended in a liquid electrolyte.

According to the present description, systems and methods for internally heating battery electrolytes (e.g. solid-state battery electrolytes) may include resistive heating wherein the embedded resistively heatable materials are heated by applying a direct current. Alternatively, systems and methods for internally heating battery electrolytes may include induction heating wherein the embedded or suspended inductively heatable materials are heated by applying an alternating current to an induction coil that surrounds the battery. In another alternative, systems and methods for internally heating battery electrolytes may include dielectric heating wherein the embedded or suspended dielectrically heatable materials are heated by applying an electromagnetic wave to the current collectors of the battery and using the heat generated through dielectric loss to heat the electrolyte.

According to the present description, fast charging of an electric vehicle may require the internal heating of battery electrolytes, particularly solid-state battery electrolytes. Systems and methods for fast charging of electric vehicles may include resistively heatable materials embedded in a solid electrolyte, or inductively heatable materials, or dielectrically heatable materials suspended in liquid electrolyte or embedded in solid electrolyte.

According to the present description, fast charging of an electric vehicle may require the internal heating of battery electrolytes, particularly solid-state electrolytes. Systems and methods for fast charging of electric vehicles may include resistive heating wherein the resistively heatable materials are heated by applying a current. Alternatively, systems and methods for internally heating battery electrolytes may include induction heating wherein the inductively heating elements are heated by applying an alternating magnetic field. In another alternative, systems and methods for internally heating battery electrolytes may include dielectric heating wherein the dielectrically heatable materials are heated by applying an electromagnetic wave.

According to the present description, acceleration of an electric vehicle may require the internal heating of battery electrolytes, particularly solid-state electrolytes. Systems and methods for acceleration of electric vehicles may include resistively heatable materials embedded in a solid electrolyte, or inductively heatable elements, or dielectrically heatable materials suspended in liquid electrolyte or embedded in electrolyte.

According to the present description, acceleration of an electric vehicle may require the internal heating of battery electrolytes, particularly solid electrolytes. Systems and methods for acceleration of electric vehicles may include resistive heating wherein the resistively heatable materials are heated by applying a current. Alternatively, systems and methods for internally heating battery electrolytes may include induction heating wherein the inductively heating elements are heated by applying an alternating magnetic field. In another alternative, systems and methods for internally heating battery electrolytes (may include dielectric heating wherein the dielectrically heatable materials are heated by applying an electromagnetic wave.

According to the present description, electric vehicle operation in cold weather, and in some instances in combination with fast charge and acceleration, may require the internal heating of battery electrolytes, particularly solid-state electrolytes. Systems and methods for cold weather operation of electric vehicles may include resistively heatable materials embedded in a solid electrolyte, or inductively heatable materials, or dielectrically heatable materials, suspended in liquid electrolyte or embedded in solid electrolyte.

According to the present description, electric vehicle operation in cold weather, and in some instances in combination with fast charge and acceleration, may require the internal heating of battery electrolytes, particularly solid-state electrolytes. Systems and methods for cold weather operation may include resistive heating wherein the resistively heatable materials are heated by applying a current. Alternatively, systems and methods for internally heating battery electrolytes may include induction heating wherein the inductively heating elements are heated by apply an alternating magnetic field. In another alternative, systems and methods for internally heating battery electrolytes may include dielectric heating wherein the dielectrically heatable materials are heated by applying an electromagnetic wave.

According to the present description, a component of the above systems and methods may include a solid-state battery wherein the solid electrolyte has resistively heatable, inductively heatable, or dielectrically heatable materials embedded within. The heating of the electrolyte may enable fast charging and acceleration, and cold weather operation of electric vehicles.

In an aspect, electrolytes may include liquid electrolytes, gel electrolytes, solid electrolytes, or combinations thereof.

In an aspect, solid electrolytes may include, for example, a ceramic-polymer composite, wherein the composite may be composed of an ionic conducting ceramic and a binding polymer. In some instances, the solid electrolyte may be devoid of the ionic conducting ceramic in which case the solid electrolyte is an ionic conducting solid polymer.

In another aspect, a solid ceramic-polymer composite, or in some instances a solid polymer, electrolyte may be supported on a fabric support. A fabric support may include, for example, a textile-based fabric support or a metal mesh-based fabric support. In the case of a metal mesh-based fabric support, the fabric support may be coated (e.g. conformally coated) with a thin electrically, ionically, or electrically and ionically insulative layer.

In yet another aspect, a small amount of liquid electrolyte may be added to a solid-state battery to facilitate ionic conduction at the ceramic-polymer composite electrolyte and electrode interfaces. Such systems may be termed hybrid or semi-solid battery.

In yet another aspect, exemplary methods to heat the solid electrolyte may include, for example, resistive heating, inductive heating, or dielectric heating. Exemplary methods to heat the liquid electrolyte may include, for example, inductive heating, or dielectric heating.

In yet another aspect, wires or fibers embedded in the solid electrolyte may be used as heating elements for resistive heating, inductive heating, or dielectric heating.

In yet another aspect, materials with sufficient inductive heating properties may be embedded within the solid electrolyte or suspended within the liquid electrolyte as inductively heatable materials for inductive heating.

In yet another aspect, materials with sufficient dielectric loss may be embedded within the solid electrolyte or suspended within the liquid electrolyte as dielectrically heatable materials for dielectric heating.

In yet another aspect, a metal mesh (e.g. metal mesh-based fabric support) may be used as the heatable material in resistive heating or inductive heating.

In yet another aspect, a textile-based fabric support may be used as the heatable material in dielectric heating.

In yet another aspect, resistive heating, inductive heating, or dielectric heating may be used to enable fast charging and acceleration of electric vehicles at ambient conditions.

In yet another aspect, resistive heating, inductive heating, or dielectric heating may be used to enable electric vehicle operation in cold weather in combination with fast charging and acceleration.

The present description relates to a liquid electrolyte to for a liquid electrolyte battery.

A liquid electrolyte may have the following characteristics.

Liquid electrolytes may include, for example, an organic-based liquid electrolyte or a room temperature ionic liquid electrolyte.

Examples of organic-based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

Examples of room temperature ionic liquid electrolyte may include, for example, imidazolium, pyrrolidinium, piperidinium, ammonium, hexafluorophosphate, dicyanamide, tetrachloroaluminate, sulfonium, phosphonium, pyridinium, parazonium and thiazolium.

An organic-based liquid electrolyte and a room temperature ionic liquid electrolyte may include an ionic conducting salt.

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2)$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl)imide ($Mg(FSI)_2$), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2)$, $KNO_3$, $Al(NO_3)_2$, $AlCl_3$, $Al_2(SO_4)_3$, $AlBr_3$, $AlI_3$, AlN, AlSCN, $Al(ClO_4)_3$.

The present description relates to a gel polymer electrolyte.

A gel polymer electrolyte may include, for example, a liquid electrolyte, a polymer, and an ionic conducting salt.

A liquid electrolyte in a gel polymer electrolyte may have the following characteristics.

Liquid electrolytes in a gel polymer electrolyte may include, for example, an organic-based liquid electrolyte or a room temperature ionic liquid electrolyte.

Examples of organic-based liquid electrolyte in a gel polymer electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

Examples of room temperature ionic liquid electrolyte in a gel polymer electrolyte may include, for example, imidazolium, pyrrolidinium, piperidinium, ammonium, hexafluorophosphate, dicyanamide, tetrachloroaluminate, sulfonium, phosphonium, pyridinium, parazonium and thiazolium.

Examples of ionic conducting salts in a gel polymer electrolyte may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2)$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl) imide ($Mg(FSI)_2$), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2)$, $KNO_3$, $Al(NO_3)_2$, $AlCl_3$, $Al_2(SO_4)_3$, $AlBr_3$, $AlI_3$, AlN, AlSCN, $Al(ClO_4)_3$.

Examples of a polymer in a gel polymer electrolyte may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

The present description relates to solid electrolytes for a solid-state battery.

A solid electrolyte may include, for example, a ceramic-polymer composite solid-state electrolyte. A ceramic-polymer composite solid-state electrolyte may be composed of, for example, a binding polymer, ionic conducting salt, and an ionic conducting ceramic.

The present description relates to a binding polymer.

Polymers for the crosslinked binding polymer matrix may be ionic conducting polymers or nonionic conducting polymers.

Examples of binding polymers included, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

The present description relates to an ionic conducting salt.

Ionic conducting salts may be dispersed throughout the binding polymer matrix.

An ionic conducting salt may conduct ions such as, for example, lithium ion, sodium ion, potassium ion, manganese ion, magnesium ion, aluminum ion, iron ion, etc.

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2)$, $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), $NaSCN$, $NaBr$, $NaI$, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl)imide ($Mg(FSI)_2$), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2)$, $KNO_3$, $Al(NO_3)_2$, $AlCl_3$, $Al_2(SO_4)_3$, $AlBr_3$, $AlI_3$, AN, AlSCN, $Al(ClO_4)_3$.

The present description relates to an ionic conducting ceramic.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Zn^{2+}$, $Fe^{3+}$, $Al^{3+}$, etc.

The ionic conductivity of the corresponding ions is preferably to be $>10^{-7}$ S/cm. It is preferably to have lower electrical conductivity ($\leq 10^{-7}$ S/cm).

Examples of the solid-state ionic conductive material include but not limited to a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n=7+a'+2 \cdot a''-b'-2 \cdot b''-3 \cdot c'-4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_1-xAl_xGe_{2-x}(PO_4)_3$), LATP ($Li_1+xAl_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials with the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^2=O^{2-}$, $S^{2-}$, $Se^{2-}$, $T^{2-}$, or a combination thereof; $X^-=F^-$, $Cl^-$, $Br^-$, $I^-$, or a combination thereof; and x is in the range of $0 \leq x \leq 2$.

The ionic conductive ceramics may have a weight content 0 to 99.99% relative to the binding polymer content.

In the case of zero weight percent relative to the binding polymer content, the ceramic-polymer composite may be more accurately referred to as a solid polymer electrolyte, wherein the solid polymer electrolyte is ionically conductive.

Generally the binding polymer may be chemically stable with the ionic conductive ceramics. Alternatively, and in some instances, the binding polymer may chemically react with the ionic conductive ceramics to improve ionic conductivity.

In some instances, a ceramic-polymer composite may contain nonionic conducting additives. These additives may be added for the purposes of, for example, easy of processing, stability, mechanical strength, dielectrically heatable materials etc.

Examples of nonionic conductive additives may include, for example, inorganics such as alumina, titania, lanthanum oxide or zirconia; epoxies, resins, plasticizers, surfactants, binders etc.

The present description relates to a fabric support.

A fabric support may be electrically insulative as in the case of a textile-based fabric support. Alternatively, a fabric support may be electrically conductive but with an electrically, ionically, or electrically and ionically insulative coating as in the case of a metal-mesh-based fabric support.

A fabric support may enable roll-to-roll processing of a solid electrolyte, wherein a solid-state electrolyte (e.g. ceramic-polymer composite solid electrolyte) is coated onto the fabric support.

The present description relates to a textile-based fabric support.

A textile-based fabric support may be ionic conductive or nonionic conductive.

A textile-based fabric support may be woven or nonwoven, with nonwoven being the preferred choice.

A textile-based fabric support may have a thickness ranging from $0.01<t<1000$ μm, with a preferred thickness of $0.1<t<500$ μm.

Fabrication approaches for a textile-based fabric support may include, for example, weaving, knitting, crocheting, knotting, tatting, felting, braiding, electrospinning and electrospraying.

The textile-based fabric support may be made from natural fibers or synthetic fibers.

Natural fibers may include, for example, cotton, stem or bast fibers such as flax or hemp; leaf fibers such as sisal; husk fibers such as coconut; and animal fibers such as wool, silk, cashmere, chitin, chitosan, collagen, keratin and furs.

Synthetic fibers may include, for example, polyesters, polyimides (PI), polyolefins, polyvinyl chloride (PVC), polyvinylidene chloride (PVDC), poly(methyl methacrylate) (PMMA), polyvinylidene fluoride (PVDF), polyether-polyurea copolymer, polyvinyl alcohol (PVA), polybenzimidazole, polyacrylonitrile (PAN), polyphenylene sulfide (PPS), poly(lactic acid), polyhydroquinone-diimidazopyridine, polyparaphenylene benzobisthiazole (PBT), polyparaphenylene benzobisimidazole (PBI), polyethylene terephthalate (PET), polyparaphenylenebenzobisoxazole (PBO), poly(p-phenylene-2,6-benzobisoxazole), Kevlar, 6-nylon, 66-nylon, acrylic fibers, cellulose fibers and polyethylene naphthalate, polyether ether ketone, modified polyphenylene ether (PPE), glass fibers, fiberglass, other liquid crystal polymers and mixtures using these two or more.

The textile-based fabric support may be composed of common textiles which may include, for example, satin, denim, crepel, fleece, polyester, linen, velvet, damas, cheesecloth, chiffon, rayon, baize, batiste, chameuse, chenille, cheviot, felt, twill, velvet, jersey, lace, lycra, polycotton, etc.

A textile-based fabric support has sufficient mechanical strength to withstand any applied forces that may be necessary in a roll-to-roll process.

A textile-based fabric support has sufficient mechanical strength to withstand applied forces during secondary battery integration and cell assembly. Such cell assemblies include, for example, pouch, cylindrical, and prismatic type secondary batteries.

A textile-based fabric support may be used as the heating element in dielectric heating provided that the support is composed of a materials with a sufficiently high dielectric loss.

The present description relates to a metal mesh-based fabric support.

A metal mesh-based fabric support may be ionic conductive or nonionic conductive.

A metal mesh-based fabric support may have a thickness ranging from $0.01<t<1000$ μm, with a preferred thickness of $0.1<t<500$ μm.

A metal mesh-based fabric support may be in the form of, for example, a screen or foam.

A metal mesh-based fabric support may be composed of, for example, copper, aluminum, stainless steel, nickel, titanium, vanadium, iron, cobalt, zinc, molybdenum, niobium, etc.

A metal mesh-based fabric support may be coated (e.g. conformally coated) with an electrically, ionically, or electrically and ionically insulative layer as to avoid short circuiting.

The electrically insulative layer may have a thickness in the range of $1 \le t \le 1000$ nm, with a preferred thickness of $5 \le t \le 100$ nm.

An electrically insulative layer may be composed of, for example, polymer, metal oxide, or ceramic.

A metal mesh-based fabric support has sufficient mechanical strength to withstand any applied forces that may be necessary in a roll-to-roll process.

A metal mesh-based fabric support may be heated using resistive heating to increase the ionic conductivity of the solid electrolyte. Alternatively, a metal mesh-based fabric support may be heated using induction heating to increase the ionic conductivity of the solid electrolyte, provided that the support has inductive heating properties.

A metal mesh-based fabric support has sufficient mechanical strength to withstand applied forces during secondary battery integration and cell assembly. Such cell assemblies include, for example, pouch, cylindrical, and prismatic type secondary batteries.

The present description relates to batteries (e.g. solid-state batteries). The batteries may include an anode, a cathode, and an electrolyte. The batteries may further include a cathode current collector and an anode current collector. The batteries may further include a housing for housing the anode, cathode, electrolyte, anode current collector, and cathode current collector.

A battery may include a secondary battery that is rechargeable or not limited to one discharge cycle.

A battery may be in the form of, for example, ion-based liquid batteries, ion-based solid-state batteries, metal-based liquid batteries or a metal-based solid-state batteries.

Active components for a battery include an anode and cathode that are in electrical contact through an external circuit but physically separated by an electrolyte, wherein some instances a solid electrolyte is supported on a fabric support.

The present description relates to an ion-based liquid or solid-state battery.

Types of secondary ion-based batteries, or intercalation batteries, may include, for example, lithium ion batteries, lithium-ion polymer, sodium ion batteries, magnesium ion batteries, aluminum ion batteries, potassium ion batteries, zinc ion batteries, lithium titanate battery, etc.

Ion-based batteries may have, for examples, a liquid electrolyte, gel polymer electrolyte, or a solid electrolyte.

A cathode for an ion-based battery may have the following characteristics.

A cathode for an ion-based solid-state battery may be a composite cathode, wherein the composite cathode may be composed of an active intercalation material, binder, electrically conductive additive, and an ionic conducting media.

A cathode or composite cathode for an ion-based battery may be composed of an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \ge x \ge 0.5$, $0.3 \ge y \ge 0.025$, $0.2 \ge z \ge 0.025$), lithium nickel cobalt aluminum oxide ($LiNi_xCo_yAl_zO_2$, $0.95 \ge x \ge 0.5$, $0.3 \ge y \ge 0.025$, $0.2 \ge z \ge 0.025$), lithium nickel manganese spinel ($LiNi_{0.5}Mn_{1.5}O_4$), etc.

The active material in a cathode or composite cathode for an ion-based battery may be coated with a protective layer to reduce resistance or enhance cycle life at the active material/ionic conducting media interface. Such layers are preferably composed materials capable of ionic conduction.

A cathode or composite cathode for an ion-based battery may be composed of a binder such as, for example, polyvinylidene fluoride, polyacrylic acid, lotader, carboxymethyl cellulose, styrene-butadiene rubber, sodium alginate, etc.

A cathode or composite cathode for an ion-based battery may be composed of an electrically conductive additive such as, for example, graphene, reduced graphene oxide, carbon nanotubes, carbon black, Super P, acetylene black, carbon nanofibers or a conductive polymer such as polyaniline, polypyrrole, poly(3,4-ethylenedioxythiophene (PEDOT), polyphenylene vinylene etc.

A composite cathode for an ion-based solid-state battery may be composed of an ionic conducting media.

The ionic conducting media in a composite cathode for an ion-based solid-state battery may include, for example, an ionically conducting polymer, or polymer-ceramic composite, wherein the polymer matrix contains an ionically conducting salt and an ionically conducting ceramic.

Examples of polymers in an ionic conducting media may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts in an ionic conducting media may include, for example, lithium bis(trifluoromethanesulfonyl)imide (LiTFSI) and lithium bis(fluorosulfonyl) imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2)$, $LiNO_3$, sodium bis (trifluoromethanesulfonyl)imide (NaTFSI) and sodium bis (fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl)imide ($Mg(FSI)_2$), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2)$, $KNO_3$, $Al(NO_3)_2$, $AlCl_3$, $Al_2(SO_4)_3$, $AlBr_3$, $AlI_3$, AlN, AlSCN, $Al(ClO_4)_3$.

An ionic conductive ceramic used in a composite cathode for an ion-based solid-state battery may have the following characteristics.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Zn^{2+}$, $Fe^{3+}$, $Al^{3+}$, etc.

The ionic conductivity of the corresponding ions is preferably to be $>10^{-7}$ S/cm. It is preferably to have lower electrical conductivity ($\leq 10^{-7}$ S/cm).

Examples of the solid-state ionic conductive material include but not limited to a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n=7+a'+2 \cdot a''-b'-2 \cdot b''-3 \cdot c'-4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_1-xAl_xGe_{2-x}(PO_4)_3$), LATP ($Li_1+xAl_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials with the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^2=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \le x \le 2$.

A composite cathode for an ion-based solid-state battery may be coated with a protective layer to reduce resistance at the electrode/solid electrolyte interface and/or to enhance the cycle life of the solid-state battery. Such layers are preferably composed materials capable of ionic conduction.

A cathode or composite cathode for an ion-based battery may be coated on a metallic current collector such as, for example, aluminum foil. The metallic current collector may be used as an electrode in dielectric heating.

An anode for an ion-based battery may have the following characteristics.

An anode for an ion-based solid-state battery may be a composite anode, wherein the composite anode may be composed of an active material, binder, electrically conductive additive, and an ionic conducting media.

An active material in an anode or composite anode for an ion-based battery may interact with ions through various mechanisms including, for example, intercalation, alloying and conversion.

An anode or composite anode for an ion-based battery may be composed of an active material such as, for example, graphite, titanate, titanium oxide, silicon, tin oxide, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

The active material in an anode or composite anode for an ion-based battery may be coated with a protective layer to reduce resistance or enhance cycle life at the active material/ionic conducting media interface. Such layers are preferably composed materials capable of ionic conduction.

An anode or composite anode for an ion-based battery may be composed of a binder such as, for example, polyvinylidene fluoride, polyacrylic acid, lotader, carboxymethyl cellulose, styrene-butadiene rubber, sodium alginate, etc.

An anode or composite anode for an ion-based battery may be composed of an electrically conductive additive such as, for example, graphene, reduced graphene oxide, carbon nanotubes, carbon black, Super P, acetylene black, carbon nanofibers or a conductive polymer such as polyaniline, polypyrrole, poly(3,4-ethylenedioxythiophene (PEDOT), polyphenylene vinylene etc.

A composite anode for an ion-based solid-state battery may be composed of an ionic conducting media.

The ionic conducting media in a composite anode for an ion-based solid-state battery may include, for example, an ionically conducting polymer, or polymer-ceramic composite, wherein the polymer matrix contains an ionically conducting salt and an ionically conducting ceramic.

Examples of polymers in an ionic conducting media may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts in an ionic conducting media may include, for example, lithium bis(trifluoromethanesulfonyl)imide (LiTFSI) and lithium bis(fluorosulfonyl) imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$), $LiNO_3$, sodium bis (trifluoromethanesulfonyl)imide (NaTFSI) and sodium bis (fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl)imide ($Mg(FSI)_2$), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)

imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$), $KNO_3$, $Al(NO_3)_2$, $AlCl_3$, $Al_2(SO_4)_3$, $AlBr_3$, $AlI_3$, AN, AlSCN, $Al(ClO_4)_3$.

An ionic conductive ceramic used in a composite anode for an ion-based solid-state battery may have the following characteristics.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Zn^{2+}$, $Fe^{3+}$, $Al^{3+}$, etc.

The ionic conductivity of the corresponding ions is preferably to be $>10^{-7}$ S/cm. It is preferably to have lower electrical conductivity ($\leq 10^{-7}$ S/cm).

Examples of the solid-state ionic conductive material include but not limited to a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n=7+a'+2 \cdot a''-b'-2 \cdot b''-3 \cdot c'-4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_1-xAl_xGe_{2-x}(PO_4)_3$), LATP ($Li_1+xAl_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H═F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials with the general formula: $Li_{12-m-x}(M_mY_4^{2-})Y_{2-x}^{2-}X_x^-$, wherein $M^{m+}$=$B^{3+}$, $Ga^{3+}$, $Sb^{3+}$, $Si^{4+}$, $Ge^{4+}$, $P^{5+}$, $As^{5+}$, or a combination thereof; $Y^2$═$O^{2-}$, $S^{2-}$, $Se^{2-}$, $Te^{2-}$, or a combination thereof; $X^-$═$F^-$, $Cl^-$, $Br^-$, $I^-$, or a combination thereof; and x is in the range of $0 \leq x \leq 2$.

A composite anode for an ion-based solid-state battery may be coated with a protective layer to reduce resistance at the electrode/solid electrolyte interface and/or to enhance the cycle life of the solid-state battery. Such layers are preferably composed materials capable of ionic conduction.

An anode or composite anode for an ion-based battery may be coated on a metallic current collector such as, for example, copper foil. The metallic current collector may be used as an electrode in dielectric heating.

The present description relates to a metal-based solid-state battery.

Types of metal-based batteries, may include, for example, lithium metal batteries, sodium metal batteries, magnesium metal batteries, aluminum metal batteries, potassium metal batteries, zinc metal batteries.

Metal-based batteries may have, for examples, a liquid electrolyte, gel polymer electrolyte, or a solid electrolyte.

A cathode for a metal-based battery may have the following characteristics.

A cathode for a metal-based solid-state battery may be a composite cathode, wherein the composite cathode may be composed of an active intercalation material, binder, electrically conductive additive, and an ionic conducting media.

A cathode or composite cathode for a metal-based battery may be composed of an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes or composite cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

The active material in a cathode or composite cathode for a metal-based battery may be coated with a protective layer to reduce resistance or enhance cycle life at the active material/ionic conducting media interface. Such layers are preferably composed materials capable of ionic conduction.

A cathode or composite cathode for a metal-based battery may be composed of a binder such as, for example, polyvinylidene fluoride, polyacrylic acid, lotader, carboxymethyl cellulose, styrene-butadiene rubber, sodium alginate, etc.

A cathode or composite cathode for a metal-based battery may be composed of an electrically conductive additive such as, for example, graphene, reduced graphene oxide, carbon nanotubes, carbon black, Super P, acetylene black, carbon nanofibers or a conductive polymer such as polyaniline, polypyrrole, poly(3,4-ethylenedioxythiophene) (PEDOT), polyphenylene vinylene etc.

A composite cathode for a metal-based solid-state battery may be composed of an ionic conducting media.

The ionic conducting media in a composite cathode for a metal-based solid-state battery may include, for example, an ionically conducting polymer, or polymer-ceramic composite, wherein the polymer matrix contains an ionically conducting salt and an ionically conducting ceramic.

Examples of polymers in an ionic conducting media may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymer may be selected from poly(n-pentene-2), polypropylene, polytetrafluoroethylene, polyamides (e.g., polyamide (Nylon), poly(ϵ-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts in an ionic conducting media may include, for example, lithium bis(trifluoromethanesulfonyl)imide (LiTFSI) and lithium bis(fluorosulfonyl) imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2)$, $LiNO_3$, sodium bis (trifluoromethanesulfonyl)imide (NaTFSI) and sodium bis (fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato)borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl) imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2)$, $KNO_3$, $Al(NO_3)_2$, $AlCl_3$, $Al_2(SO_4)_3$, $AlBr_3$, $AlI_3$, AN, AlSCN, $Al(ClO_4)_3$.

An ionic conductive ceramic used in a composite cathode for a metal-based solid-state battery may have the following characteristics.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Zn^{2+}$, $Fe^{3+}$, $Al^{3+}$, etc.

The ionic conductivity of the corresponding ions is preferably to be $>10^{-7}$ S/cm. It is preferably to have lower electrical conductivity ($\leq 10^{-7}$ S/cm).

Examples of the solid-state ionic conductive material include but not limited to a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii. wherein $0 \leq c' \leq 0.5$ and $0 \leq c'' \leq 0.4$; and d. wherein $n=7+a'+2 \cdot a''-b'-2 \cdot b''-3 \cdot c'-4 \cdot c''$ and $4.5 \leq n \leq 7.5$.

In another example, a solid-state ionic conductive material includes perovskite-type oxides such as $(Li,La)TiO_3$ or doped or replaced compounds.

In yet another example, a solid-state ionic conductive material includes NASICON-structured lithium membrane, such as LAGP ($Li_1-xAl_xGe_{2-x}(PO_4)_3$), LATP ($Li_1+xAl_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials with the general formula: $Li_{12-m-x}(M_mY_4^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^2=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

A composite cathode for a metal-based solid-state battery may be coated with a protective layer to reduce resistance at the electrode/solid electrolyte interface and/or to enhance the cycle life of the solid-state battery. Such layers are preferably composed materials capable of ionic conduction.

A cathode or composite cathode for a metal-based battery may be coated on a metallic current collector such as, for example, aluminum foil. The metallic current collector may be used as an electrode in dielectric heating.

An anode for metal-based battery may have the following characteristics.

An anode for a metal-based battery may include, for example, a metal or metal-alloy interacting with ions through a plating and stripping mechanism. Such metal anodes may comprise of, for example, lithium metal, lithium metal alloy, sodium metal, sodium metal alloy, magnesium metal, magnesium metal alloy, aluminum metal, aluminum metal alloy, potassium metal, potassium metal alloy, zinc metal, zinc metal alloy. Alloying materials may include, for example, indium, manganese, etc.

A metal or metal alloy anode for a metal-based battery may be coated on a metallic current collector such as, for example, copper foil.

A metal or metal alloy anode for a metal-based solid-state battery may be coated with a protective surface layer to reduce resistance at the electrode/solid electrolyte interface or enhance cycle life. Such layers are preferably composed materials capable of ionic conduction.

The present description relates to the addition of a liquid electrolyte to a solid-state battery.

A liquid electrolyte may be added to a solid-state battery for the use of, for example, enhancing the ionic conductivity of the solid-state battery, or reducing the resistance at the electrode/solid electrolyte interface. It is preferred that the electrolyte has minimal volume in the solid-state battery.

Such solid-state batteries may be referred to as hybrid or semi-solid-state batteries.

Hybrid or semi-solid-state batteries may be either ion-based or metal-based solid-state batteries.

A liquid electrolyte for a hybrid or semi-solid-state battery may have the following characteristics.

Liquid electrolytes may include, for example, an organic-based liquid electrolyte or a room temperature ionic liquid electrolyte.

Examples of organic-based liquid electrolyte may include, for example, ethylene carbonate (EC), fluoroethylene carbonate (FEC), propylene carbonate (PC), ethylmethyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

Examples of room temperature ionic liquid electrolyte may include, for example, imidazolium, pyrrolidinium, piperidinium, ammonium, hexafluorophosphate, dicyanamide, tetrachloroaluminate, sulfonium, phosphonium, pyridinium, parazonium and thiazolium.

An organic-based liquid electrolyte and a room temperature ionic liquid electrolyte may include an ionic conducting salt.

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$), $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide ($Mg(TFSI)_2$) and magnesium bis(fluorosulfonyl)imide ($Mg(FSI)_2$), magnesium bis(oxalato)borate ($Mg(BOB)_2$), magnesium Difluro(oxalato)borate ($Mg(DFOB)_2$), $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, $KClO_4$, $KAsF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$), $KNO_3$, $Al(NO_3)_2$, $AlCl_3$, $Al_2(SO_4)_3$, $AlBr_3$, $AlI_3$, AlN, AlSCN, $Al(ClO_4)_3$.

The present disclosure relates to resistive heating.

Resistive heating, also termed Joule heating or Ohmic heating, may be defined as a process by which direct current is passed through a resistively heatable material, or elements, embedded within the ceramic-polymer composite solid electrolyte. The flow of direct current produces heat within the embedded materials thereby heating the ceramic-polymer composite electrolyte.

The present description relates to resistively heatable materials.

Resistively heatable materials include, for example, any material with an electrical conductivity above $10^{-5}$ S/cm.

The resistively heatable materials may be composed of, for example, carbon, carbon nanotubes, carbon fibers, copper, stainless steel, aluminum, gold, silver, calcium, tungsten, zinc, nickel, iron, platinum, tin, lead, titanium, Manganin, Constantan, Nichrome, gallium arsenide, germanium, lithium, silicon, silicon nitride, aluminum nitride, molybdenum, etc. Alternatively, the resistively heatable materials may be a combination of the following in the form of an alloy.

A resistively heatable material may be in the form of, for example, a wire or fiber.

A resistively heatable wire or fiber may be defined as a one-dimensional or two-dimensional material.

A resistively heatable wire or fiber may have a diameter in the range of $0.01<d<1000$ μm, with a preferred range of $0.1<d<10$ μm.

Resistively heatable wires or fibers may be commonly referred to as, for example, nanowires, nanofibers, microwires, microfibers, nanotubes, microtubes, multiwalled, single walled, etc.

A solid electrolyte may contain a single resistively heatable wire or fiber. Alternatively, a solid electrolyte may contain multiple resistively heatable wire or fibers. A solid electrolyte may be supported onto a fabric support.

A single resistively heatable wire or fiber embedded in the solid electrolyte may have the following characteristics.

The single resistively heatable wire or fiber may be coated (e.g. conformally coated) with an electrically insulative material, an ionically insulative material, or preferably an electrically and ionically insulative material, such as, for example, an electrically, and ionically, insulative polymer, metal oxide, or ceramic to form a core-shell structure to avoid electrically shorting the anode and cathode and to avoid reaction between the resistively heatable wire or fiber and other components of the battery.

Insulative coating thickness may be in the range of $0<t<3000$ nm, with a preferred range of $0<t<100$ nm.

An electrically insulative coating may have an electronic conductivity value of less than $10^{-6}$ S cm$^{-1}$, with preferred value of $10^{-9}$ S cm$^{-1}$ or less. An ionically insulative coating may have an ionic conductivity value of less than $10^{-6}$ S cm$^{-1}$, with preferred value of $10^{-9}$ S cm$^{-1}$ or less. An electrically, and ionically, insulative coating may have electronic conductivity and ionic conductivity values of less than $10^{-6}$ S cm$^{-1}$, with preferred values of $10^{-9}$ S cm$^{-1}$ or less.

In the case of a single resistively heatable wire or fiber, the resistively heatable wire or fiber may have an orientation of, for example, spiral, curled, bent, straight, or random.

In the case of a spiral, curled, or bent orientation, it is preferable that the resistively heatable wire or fiber is flat in what is commonly referred to as a pancake shape. In such an instance, it is preferable that the pancake shape wire or fiber will be positioned on to one side of the solid electrolyte near, but preferably not in contact with, the anode or cathode. In this instance, it is preferable that the solid electrolyte is supported on a fabric support. Though it is preferred that the resistive pancake shaped wire or fiber be embedded within the solid electrolyte near one surface, there may be instances where the wire or fiber makes contact with either the anode or cathode or both. Alternatively, the pancake shaped wire or fiber may be positioned in the middle of the solid electrotype, in which case it is preferable that there is no fabric support.

In the case of a straight orientation, it is preferable that the single resistively heatable wire or fiber runs in areawise of a layer of the solid electrolyte. In such an instance, the resistively heatable wire or fiber may run diagonally across the solid electrolyte. In such an instance, it is preferable that single resistively heatable wire or fiber will be positioned on to one side of the solid electrolyte near the anode or cathode. In this instance, it is preferable that the solid electrolyte is supported on a fabric support. Though it is preferred that the resistive wire or fiber be embedded within the solid electrolyte near one surface, there may be instances where the wire or fiber makes contact with either the anode or cathode, or both. Alternatively, the resistively heatable wire or fiber may be positioned in the middle of the solid electrotype, in which case it is preferable that there is no fabric support.

In the case of a random orientation, it is preferable that the resistively heatable wire or fiber orientates or transverses through the solid electrolyte through a thickness of the layer of solid electrolyte, i.e. throughout the fabric support. In this instance the single resistively heatable wire or fiber may be positioned throughout the fabric support prior to the formation of the solid electrolyte.

A single resistively heatable wire or fiber may be connected with other resistively heatable wires or fibers in neighboring solid-state battery cells, within the battery pack module of the electric vehicle, through leads exiting the solid-state battery cells in a series or parallel circuit.

Multiple resistively heatable wires or fibers embedded in the solid electrolyte may have the following characteristics.

The multiple resistively heatable wires or fibers may be coated (e.g. conformally coated) with an electrically insulative material, an ionically insulative material, or preferably an electrically and ionically insulative material, such as, for example, an electrically, and ionically, insulative polymer, metal oxide, or ceramic to form a core-shell structure to avoid electrically shorting the anode and cathode and to avoid reaction between the resistively heatable wire or fiber and other components of the battery.

Insulative coating thickness may be in the range of $0<t<3000$ nm, with a preferred range of $0<t<100$ nm.

An electrically insulative coating may have an electronic conductivity value of less than $10^{-6}$ S cm$^{-1}$, with preferred value of $10^{-9}$ S cm$^{-1}$ or less. An ionically insulative coating may have an ionic conductivity value of less than $10^{-6}$ S cm$^{-1}$, with preferred value of $10^{-9}$ S cm$^{-1}$ or less. An electrically, and ionically, insulative coating may have electronic conductivity and ionic conductivity values of less than $10^{-6}$ S cm$^{-1}$, with preferred values of $10^{-9}$ S cm$^{-1}$ or less.

In the case of multiple resistively heatable wires or fibers, the resistively heatable wires or fibers may have an orientation of, for example, straight, mesh, or random.

In the case of a straight orientation, it is preferable that the multiple resistively heatable wires or fibers run areawise of a layer of the solid electrolyte. The resistively heatable wires or fibers may run parallel to each other, with two wires or fibers running perpendicular at the ends to form the parallel circuit. In such an instance, it is preferable that resistively heatable wires or fibers will be positioned on to one side of the solid electrolyte near, but preferably not in contact with, the anode or cathode. In this instance, it is preferable that the solid electrolyte is supported on a fabric support. Though it is preferred that the resistively heatable wires or fibers be embedded within the solid electrolyte near one surface, there may be instances where the wires or fibers makes contact with either the anode or cathode or both. Alternatively, the resistively heatable wires or fibers may be positioned in the middle of the solid electrotype, in which case it is preferable that there is no fabric support.

In the case of a mesh orientation, it is preferable that the multiple resistively heatable wires or fibers run areawise of a layer of the solid electrolyte. The resistive wires or fibers may be orientated in a screen or grid like fashion, wherein the resistively heatable wires or fibers run parallel and perpendicular to each other. In such an instance, it is preferable that resistively heatable wires or fibers (or mesh) will be positioned on to one side of the solid electrolyte near, but preferably not in contact with, the anode or cathode. In this instance, it is preferable that the solid electrolyte is supported on a fabric support. Though it is preferred that the resistively heatable wires or fibers (or mesh) be embedded within the solid electrolyte near one surface, there may be instances where the wires or fibers (or mesh) makes contact with either the anode or cathode, or both. Alternatively, the resistively heatable wires or fibers (or mesh) may be positioned in the middle of the solid electrotype, in which case it is preferable that there is no fabric support. In this instance, the resistive heating mesh may be a planar, non-porous, non-supporting material in which the ceramic-polymer composite solid electrolyte is simply coated onto, wherein the mesh is not acting as a support structure.

In the case of a random orientation, the multiple resistively heatable wires or fibers may be orientated or transverse through a thickness of the layer of solid electrolyte, i.e. throughout the fabric support. In this instance the multiple resistive wires or fibers are positioned throughout the fabric support prior to the formation of the solid electrolyte. The resistively heatable wires or fibers may be in a parallel fashion with two wires or fibers running perpendicular at the ends to form the parallel circuit. Alternatively, the multiple resistive wires or fiber may be in a screen, grid, or mesh like formation throughout the fabric support.

The multiple resistively heatable wires or fibers may be connected with other resistively heatable wires or fibers in neighboring solid-state battery cells, within the battery pack module of the electric vehicle, through leads exiting the solid-state battery cells in a series or parallel circuit.

It is preferred that the multiple resistively heatable wires or fibers be formed in their desired orientation prior to the coating of an electrically, ionically, or electrically and ionically insulative layer as to allow current to flow through the entirety of the heating element.

Alternatively, a resistively heatable material may be in the form of, for example, a metal mesh-based fabric support.

In this instance, the metal mesh-based fabric support, in which the solid electrolyte is formed onto to, may serve as both a support and the resistively heatable material.

The metal mesh-based fabric support may be coated (e.g. conformally coated) with an electrically insulative material, an ionically insulative material, or preferably an electrically and ionically insulative material, such as, for example, an electrically, and ionically, insulative polymer, metal oxide, or ceramic to form a core-shell structure to avoid electrically shorting the anode and cathode and to avoid reaction between the resistively heatable metal mesh-based fabric support and other components of the battery.

Insulative coating thickness may be in the range of $0<t<3000$ nm, with a preferred range of $0<t<100$ nm.

An electrically insulative coating may have an electronic conductivity value of less than $10^{-7}$ S cm$^{-1}$, with preferred value of $10^{-9}$ S cm$^{-1}$ or less. An ionically insulative coating may have an ionic conductivity value of less than $10^{-6}$ S cm$^{-1}$, with preferred value of $10^{-9}$ S cm$^{-1}$ or less. An electrically, and ionically, insulative coating may have electronic conductivity and ionic conductivity values of less than $10^{-7}$ S cm$^{-1}$, with preferred values of $10^{-9}$ S cm$^{-1}$ or less.

The present description relates to the resistive heating system.

A power source may be used to provide current to the electronically and/or ionically, insulative coated resistive heatable materials.

A power source for the resistive heating system may include an internal power source such as the solid-state batteries within the electric vehicle battery pack themselves.

A power source for the resistive heating system may include an external power source.

In this instance the current may be generated from a charging station. Said charging station may be connected to the grid or powered from a stationary power generating platform. A stationary power generating platform may get power for a source such as, for example, solar, wind, flow battery, etc.

Alternatively, the current may be generated from a home plugin source.

An external power source for the resistive heating system may include an onboard backup power system in the electric vehicle.

A backup power source may include a secondary battery system. Alternatively, the backup power source may include a capacitor, supercapacitor, electrochemical capacitor, ultracapacitor, fuel cell, redox flow cell, etc.

Resistive heating may be initiated by the charging of the battery pack, wherein the charging station provides the power for the resistive heating allowing the battery pack to charge quickly.

Resistive heating may be initiated by the depressing of the acceleration pedal to provide an additional boost during electric vehicle acceleration.

Resistive heating may be initiated by a temperature sensor in or around the electric vehicle to enable resistive heating in cold weather.

The present description relates to induction heating.

Induction heating may be defined as a process by which alternating current is passed through an induction coil, wherein an alternating magnetic field is generated within said coil. A battery (e.g. solid-state battery) may either be positioned within the induction coil or in close proximity thereof as to be within the generated alternating magnetic field. The alternating magnetic field generates eddy currents within the inductively heatable materials embedded or suspended within the electrolyte (e.g. ceramic-polymer composite solid electrolyte). The eddy currents generate heat within the embedded or suspended materials and thus providing a direct internal heat source for the electrolyte.

The present description relates to inductively heatable materials.

Inductively heatable materials include any material capable of generating eddy currents when in the presences of an induced magnetic field. Such materials may be described as conductors, ferromagnetic materials, or semiconductors.

Inductively heatable materials may include materials such as, for example, iron, steel, nickel, zinc, cobalt, aluminum, copper, silicon, carbon, neodymium, manganese, ferrite, magnetite ($Fe_3O_4$), brass, silicon carbide, $Co_2Ba_2Fe_{12}O_{22}$, $SrFe_{12}O_{19}$, and the alloys and mixtures of them.

Inductively heatable materials may be in the form of, for example, a wire or fiber, a single element or particle, or a metal mesh-based fabric support.

Inductively heatable wires or fibers embedded in the solid electrolyte may have the following characteristics.

The inductively heatable wires or fibers may be coated with an electrically insulative material such as, for example, an electrically insulative polymer, metal oxide, or ceramic to form a core-shell structure.

Electrically insulative coating thickness may be in the range of $0<t<3000$ nm, with a preferred range of $0<t<100$ nm.

An electrically insulative coating may have electronic conductivity value of less than $10^{-6}$ S cm$^{-1}$, with preferred value of $10^{-9}$ S cm$^{-1}$ or less.

An inductively heatable wire or fiber may be defined as a one-dimensional or two-dimensional material.

An inductively heatable wire or fiber may have a diameter in the range of $0.01<d<1000$ μm, with a preferred range of $0.1<d<10$ μm.

Inductively heatable wires or fibers may be commonly referred to as, for example, nanowires, nanofibers, microwires, microfibers, nanotubes, microtubes, multiwalled, single walled, etc.

A solid electrolyte may contain multiple inductively heatable wires or fibers. And the solid electrolyte may be supported onto a fabric support.

The inductively heatable wires or fibers may have an orientation of, for example, spiral, curled, bent, straight, mesh, or random.

In the case of a spiral, curled, or bent orientation, it preferable that a single inductively heatable wire or fiber is flat in what is commonly referred to as a pancake shape. In such an instance, it is preferable that the pancake shape wire or fiber will be positioned on to one side of the solid electrolyte near. In this instance, it is preferable that the solid electrolyte is supported on a fabric support. Though it is preferred that the pancake shaped wire or fiber be embedded within the solid electrolyte near one surface, there may be instances where the wire or fiber makes contact with either the anode or cathode or both. Alternatively, the pancake shaped wire or fiber may be positioned in the middle of the solid electrotype, in which case it is preferable that there is no fabric support.

In the case of a straight orientation, it is preferable that multiple inductively heatable wires or fibers run areawise of a layer solid electrolyte. The inductively heatable wires or fibers may run parallel to each other. In such an instance, it is preferable that the inductively heatable wires or fibers will be positioned on to one side of the solid electrolyte near, but preferably not in contact with, the anode or cathode. In this instance, it is preferable that the solid electrolyte is supported on a fabric support. Though it is preferred that the inductively heatable wires or fibers be embedded within the solid electrolyte near one surface, there may be instances where the wires or fibers make contact with the anode or cathode or both. Alternatively, the inductively heatable wires or fibers may be positioned in the middle of the solid electrotype, in which case it is preferable that there is no fabric support.

In the case of a mesh orientation, it is preferable that the multiple inductively heatable wires or fibers run areawise of a layer of the solid electrolyte. The inductively heatable wires or fibers may be orientated in a screen or grid like fashion. In such an instance, it is preferable inductively heatable wires or fibers (or mesh) will be positioned on to one side of the solid electrolyte near the anode or cathode. In this instance, it is preferable that the solid electrolyte is supported on a fabric support. Though it is preferred that the inductively heatable wires or fibers (or mesh) be embedded within the solid electrolyte near one surface, there may be instances where the wires or fibers (or mesh) makes contact with the anode or cathode or both. Alternatively, the inductively heatable wires or fibers (or mesh) may be positioned in the middle of the solid electrotype, in which case it is preferable that there is no fabric support. In this instance, the mesh is a planar, non-porous, non-supporting material in which the solid electrolyte is simply coated onto, wherein the mesh is not acting as a support structure.

In the case of a random orientation, the multiple inductively heatable wires or fibers may be orientated or transverse through a thickness of the layer of solid electrolyte, i.e. throughout the fabric support. In this instance the inductively heatable wires or fibers are positioned throughout the fabric support prior to the formation of the solid electrolyte. The inductively heatable wires or fibers may be in a parallel fashion or, a screen, grid, or mesh like formation throughout the fabric support. Alternatively, the wires or fibers are mixed with the solid electrolyte prior to the formation onto the fabric support.

Inductively heatable single elements or particles may have the following characteristics.

An inductively heatable single elements or particles may be defined as a zero-dimensional powders or two-dimensional flakes or sheets.

Inductively heatable particles may have a particle size in the range of $0<s<100$ μm, with a preferred range of $0<s<1$ μm.

The inductively heatable particles may be commonly referred to as, for example, quantum dots, nano dots, powder, micro particles, flakes, etc.

The inductively heatable particles may be coated with an electrically insulative organic material such an electrically insulative polymer or an electrically insulative inorganic material to form a core-shell structure.

Electrically insulative coating thickness may be in the range of $0<t<3000$ nm, with a preferred range of $0<t<100$ nm.

An electrically insulative coating may have electronic conductivity values of less than $10^{-6}$ S $cm^{-1}$, with preferred values of $10^{-9}$ S $cm^{-1}$ or less.

Inductively heatable particles may be suspended/dispersed in a precursor solution and then become part of the final solid electrolyte matrix. The solid electrolyte may then be formed onto a fabric support.

Alternatively, the inductively heatable particles may be deposited onto a fabric support using methods such as, for example, drop casting, spin coating, spraying, tape casting, dip coating, evaporation, Langmuir-Blodgett, gel casting, chemical vapor deposition, physical vapor deposition, etc., prior to the coating of a ceramic-polymer composite solid electrolyte.

Inductively heatable particles may be suspended or dispersed by the use of a surfactant, in the case of liquid electrolytes.

Surfactants may be anionic, cationic, nonionic, or amphoteric. Anionic surfactants may include, for example, sulfates ($C_nH_{2n+1}OSO_3^-Na^+$), sulfonates ($C_nH_{2n+1}SO_3H$), phosphates ($C_nH_{2n+1}OPO_3H_2$), carboxylates ($C_nH_{2n+1}COOH$). Cationic surfactants may include, for example, alkylammonium ($C_nH_{2n+1}(CH_3)NX$ [X═OH, Cl, Br, $HSO_4$]), dialkylammonium ($(C_{16}H_{33})_2(CH_3)_2N^+Br^-$). Non-ionic surfactants may include, for example, primary amines ($C_nH_{2n+1}NH_2$), polyethylene oxides ($HO(CH_2CH_2O)_nH$).

Inductively heatable particles may be deposited onto a porous battery separator.

Porous battery separator materials may include, for example, nonwoven fibers, such as cloth, nylon, polyester, glass fiber, glass mats, polymers, such as polyethylene, polypropylene, poly(tetrafluoroethylene, polyvinyl chloride, polyamide, polyolefin, polyacrylonitrile, cellulose, and natural materials, such as wood, rubber, and asbestos.

Inductively heatable particles may be deposited onto, or within, a separator using methods such as, for example, drop casting, spin coating, spraying, tape casting, dip coating, evaporation, Langmuir-Blodgett, gel casting, chemical vapor deposition, physical vapor deposition, etc.

The inductively heatable particles may be introduced into the separator production process so that the inductive heating materials are embedded in the separators Inductively heatable fabric support may have the following characteristics.

An inductively heatable material may be in the form of, for example, a metal mesh-based fabric support.

In this instance, the metal mesh-based fabric support, in which the solid electrolyte is formed onto to, may serve as both a support and the inductively heatable material.

The metal mesh-based fabric support may be coated with an electrically insulative material such as, for example, an electrically insulative polymer, metal oxide, or ceramic to form a core-shell structure.

Electrically insulative coating thickness may be in the range of 0<t<3000 nm, with a preferred range of 0<t<100 nm.

An electrically insulative coating may have electronic conductivity values of less than $10^{-6}$ S $cm^{-1}$, with preferred values of $10^{-9}$ S $cm^{-1}$ or less.

The present description relates to the induction coil of an induction heating system.

The induction heating coil may also be referred to as the electromagnetic induction source.

An induction coil may be used to pass an alternating current to induce magnetic field coupling.

The magnetic field may induce eddy currents inside the inductively heatable materials embedded in the ceramic-polymer composite solid electrolyte.

Preferably the induction coil is made up of copper. Alternatively, materials may include, for example, aluminum, silver, gold, brass, nickel, tungsten, chromium, carbon, or a mix in the form of an alloy, etc.

The induction coil may be in the shape of, for example, multiturn single place, single-turn single place, single-turn single place, round, rectangular, formed, pancake or spiral helical.

The induction coil may be orientated around the solid-state battery or solid-state batteries in such a fashion that the inductively heatable materials are within the induced magnetic field.

Examples or induction coil orientations are as follows.

In an example, an induction coil may be orientated around individual solid-state battery cells.

In another example, an induction coil may be built into and part of the individual solid-state battery casing.

In yet another example, an induction coil may be orientated around a solid-state battery module inside the electric vehicle battery pack. A solid-state battery module can be defined as a housing (e.g. compartment) that houses more than one individual solid-state battery.

In yet another example, an induction coil may be orientated around a group of solid-state battery modules inside the electric vehicle battery pack.

In yet another example, an induction coil may be orientated around the entire solid-state battery pack. A solid-state battery pack may be defined as pack that houses all solid-state battery modules within an electric vehicle.

In yet another example, an induction coil may be orientated exterior of the electric vehicle. In this example, it is expected that the electric vehicle will drive over, drive by, or park over the induction coil.

The present description relates to the induction heating system.

A power source may be used to provide alternating current to the induction coils and via the induction heating system.

A power source for the induction heating system may have the following characteristics.

A power source for the induction heating system may include an internal power source such as the solid-state batteries within the electric vehicle battery pack themselves.

A power source for the induction heating system may include an external power source.

In this instance the alternating current may be generated from a charging station. Said charging station may be connected to the grid or powered from a stationary power generating platform. A stationary power generating platform may get power for a source such as, for example, solar, wind, flow battery, etc.

Alternatively, the alternating current may be generated from a home plugin source.

An external power source for the induction heating system may include an onboard backup power system in the electric vehicle.

In this instance, the onboard backup power source may not be the primary power source or battery pack for the electric vehicle. However, the backup power source may be in electrical connection with the induction coils.

A backup power source may include a secondary battery system. Alternatively, the backup power source may include a capacitor, supercapacitor, electrochemical capacitor, ultracapacitor, fuel cell, redox flow cell, etc.

The induction heating system may have the following characteristics.

Induction heating system, or the alternating current, may have a frequency in the range of 1 kHz<f<1 MHz, with a preferred range of 10 kHz<f<700 kHz.

The alternating current may be continuous or pulsed.

The alternating current may be pulsed at intervals with a duration in the range of 0.000001≤s≤10 seconds, with a preferred range of 0.001≤s≤1 seconds. Time between intervals may have a duration in the range of 0.001≤s≤1000 s, with a preferred range of 1≤s≤100 seconds.

Induction heating may be initiated by the charging of the battery pack, wherein the charging station provides the power for the induction heating system allowing the battery pack to charge quickly Induction heating may be initiated by the depressing of the acceleration pedal to provide an additional boost during electric vehicle acceleration.

Induction heating may be initiated by a temperature sensor in or around the electric vehicle to enable induction heating in cold weather.

The present description relates to dielectric heating.

Dielectric heating may be defined as a process by which an electromagnetic wave can be applied to the current collectors of the solid-state battery. The electromagnetic wave can be coupled with materials, embedded in the electrolyte, with a high dielectric loss which in turn can heat the system up. The high dielectric loss material can also be the electrolyte material itself provided that the electrolyte material has a sufficiently high dielectric loss. The parameters of the wave are tuned to specifically heat the embedded dielectric materials.

The present description relates to dielectrically heatable materials.

Dielectrically heatable materials include, for example, any material with a dielectric loss of 1% or higher, with a preferable minimum dielectric loss of 5% or higher, and any material with an electrical conductivity below $10^{-10}$ S/cm.

Dielectrically heatable materials may be electrically insulative. Elements may be composed of, for example, polymers, inorganic compounds, organic-inorganic composite, or mixture, etc.

Dielectrically heatable elements may be in the form of, for example, zero-dimension particles, a one-dimension wire or fiber, a two-dimension flakes, or sheet, or the whole electrolyte membrane as a bulk.

Dielectrically heatable particles embedded or suspended in the electrolyte may have the following characteristics.

Dielectrically heatable particles may be defined as zero-dimension powders, wherein the powders can be either inorganic or organic, wherein the powders have a high dielectric loss.

Dielectrically heatable particles may be defined as two-dimensional flakes, or sheets, wherein the flakes or sheets can be either inorganic or organic, wherein the flakes or sheets have a high dielectric loss.

The dielectrically heatable particles may have a diameter range of 0.01<d<1000 μm, with a preferred range of 0.1<d<10 μm with any possible shapes.

The dielectrically heatable particles may be electrically insulative as to not short the batteries internally.

Dielectrically heatable particles may be suspended/dispersed in a precursor solution and then become part of the final solid electrolyte matrix. The solid electrolyte may then be formed onto the fabric support.

Alternatively, the dielectrically heatable particles may be deposited onto a fabric support using methods such as, for example, drop casting, spin coating, spraying, tape casting, dip coating, evaporation, Langmuir-Blodgett, gel casting, chemical vapor deposition, physical vapor deposition, etc., prior to the coating of a ceramic-polymer composite solid electrolyte.

Dielectrically heatable materials may be suspended or dispersed by the use of a surfactant, in the case of liquid electrolytes.

Surfactants may be anionic, cationic, nonionic, or amphoteric. Anionic surfactants may include, for example, sulfates ($C_nH_{2n+1}OSO_3^-Na^+$), sulfonates ($C_nH_{2n+1}SO_3H$), phosphates ($C_nH_{2n+1}OPO_3H_2$), carboxylates ($C_nH_{2n+1}COOH$). Cationic surfactants may include, for example, alkylammonium ($C_nH_{2n+1}(CH_3)NX$ [X=OH, Cl, Br, $HSO_4$]), dialkylammonium ($(C_{16}H_{33})_2(CH_3)_2N^+Br^-$). Non-ionic surfactants may include, for example, primary amines ($C_nH_{2n+1}NH_2$), polyethylene oxides ($HO(CH_2CH_2O)_nH$).

Dielectrically heatable materials may be deposited onto a porous battery separator.

Porous battery separator materials may include, for example, nonwoven fibers, such as cloth, nylon, polyester, glass fiber, glass mats, polymers, such as polyethylene, polypropylene, poly(tetrafluoroethylene, polyvinyl chloride, polyamide, polyolefin, polyacrylonitrile, cellulose, and natural materials, such as wood, rubber, and asbestos.

Dielectrically heating materials may be deposited onto, or within, a separator using methods such as, for example, drop casting, spin coating, spraying, tape casting, dip coating, evaporation, Langmuir-Blodgett, gel casting, chemical vapor deposition, physical vapor deposition, etc.

The dielectrically heating materials may be introduced into the separator production process so that the inductive heating materials are embedded in the separators In some instances, a porous battery separator itself may be the dielectrically heatable material, provided that it is composed of a material with a sufficient dielectric loss.

Dielectrically heatable wires or fibers embedded in the solid electrolyte may have the following characteristics.

A dielectrically heatable wire or fiber may be defined as a one-dimensional or two-dimensional material.

A dielectrically heatable wire or fiber may have a diameter in the range of 0.01<d<3000 μm, with a preferred range of 0.1<d<10 μm.

Dielectrically heatable wires or fibers may be commonly referred to as, for example, nanowires, nanofibers, microwires, microfibers, nanotubes, microtubes, multiwalled, single walled, etc.

A solid electrolyte may contain multiple dielectrically heatable wires or fibers. And the solid electrolyte may be supported onto a fabric support.

The dielectrically heatable wires or fibers may have an orientation of, for example, spiral, curled, bent, straight, mesh, or random.

In the case of a spiral, curled, or bent orientation, it preferable that a single dielectrically heatable wire or fiber is flat in what is commonly referred to as a pancake shape. In such an instance, it is preferable that the pancake shape wire or fiber will be positioned on to one side of the solid electrolyte near. In this instance, it is preferable that the solid electrolyte is supported on a fabric support. Though it is preferred that the dielectric pancake shaped wire or fiber be embedded within the solid electrolyte near one surface, there may be instances where the wire or fiber makes contact with either the anode or cathode. Alternatively, the pancake shaped wire or fiber may be positioned in the middle of the solid electrotype, in which case it is preferable that there is no fabric support.

In the case of a straight orientation, it is preferable that multiple dielectrically heatable wires or fibers run areawise of a layer solid electrolyte. The dielectrically heatable wires or fibers may run parallel to each other. In such an instance, it is preferable that the dielectrically heatable wires or fibers will be positioned on to one side of the solid electrolyte near, but preferably not in contact with, the anode or cathode. In this instance, it is preferable that the solid electrolyte is supported on a fabric support. Though it is preferred that the dielectrically heatable wires or fibers be embedded within the solid electrolyte near one surface, there may be instances where the wires or fibers make contact with either the anode or cathode or both. Alternatively, the dielectrically heatable wires or fibers may be positioned in the middle of the solid electrotype, in which case it is preferable that there is no fabric support.

In the case of a mesh orientation, it is preferable that the multiple dielectrically heatable wires or fibers run areawise of a layer of the solid electrolyte. The dielectrically heatable wires or fibers may be orientated in a screen or grid like fashion. In such an instance, it is preferable dielectrically heatable wires or fibers (or mesh) will be positioned on to one side of the solid electrolyte near. In this instance, it is preferable that the solid electrolyte is supported on a fabric support. Though it is preferred that the dielectrically heatable wires or fibers (or mesh) be embedded within the solid electrolyte near one surface, there may be instances where the wires or fibers (or mesh) makes contact with either the anode or cathode, but not both simultaneously. Alternatively, the dielectrically heatable wires or fibers (or mesh) may be positioned in the middle of the solid electrotype, in which case it is preferable that there is no fabric support. In this instance, the dielectric mesh is a planar, non-porous, non-supporting material in which the solid electrolyte is simply coated onto, wherein the mesh is not acting as a support structure.

In the case of a random orientation, the multiple dielectrically heatable wires or fibers may be orientated or transverse through a thickness of the layer of solid electrolyte, i.e. throughout the fabric support. In this instance the dielectrically heatable wires or fibers are positioned throughout the fabric support prior to the formation of the solid electrolyte (e.g. ceramic-polymer composite solid-state electrolyte). The dielectrically heatable wires or fibers may be in a parallel fashion or, a screen, grid, or mesh like formation throughout the fabric support. Alternatively, the wires or fibers are mixed with the solid electrolyte (e.g. ceramic-polymer composite solid-state electrolyte) prior to the formation onto the fabric support.

A dielectrically heatable material may be in the form of a textile-based fabric support. In such an instance, the textile-based fabric support, in which the ceramic-polymer composite solid electrolyte is formed onto to, may serve as both a support and the dielectrically heatable material.

The present description relates to the dielectric heating system.

A power source may be used to provide the electromagnetic wave to the current collectors and via the dielectric heating system.

A power source for the dielectric heating system may have the following characteristics.

A power source for the dielectric heating system may include an internal power source such as the solid-state batteries within the electric vehicle battery pack themselves.

A power source for the dielectric heating system may include an external power source.

An external power source for the dielectric heating system may be a charging station, wherein the electromagnetic wave is generated and provided by a charging station. Said charging station may be connected to the grid or powered from a stationary power generating platform. A stationary power generating platform may get power for a source such as, for example, solar, wind, flow battery, etc.

Alternatively, the electromagnetic wave may be generated from a home plugin source.

An external power source for the dielectric heating system may include an onboard backup power system in the electric vehicle.

A backup power source may include a secondary battery system. Alternatively, the backup power source may include a capacitor, supercapacitor, electrochemical capacitor, ultracapacitor, fuel cell, redox flow cell, etc.

The dielectric heating system may have the following characteristics.

A dielectric heating system may operate in a high frequency range of, for example, $10^3 \leq f \leq 10^{12}$ Hz. The frequency range may include, for example, microwave, radio, infrared, etc.

The electromagnetic wave applied to the current collectors may be continuous or pulsed.

The electromagnetic wave may be pulsed at intervals with a duration in the range of $1 \leq s \leq 1000$ seconds, with a preferred range of $10 \leq s \leq 300$ seconds. Time between intervals may have a duration in the range of $1 \leq s \leq 1000$ s, with a preferred range of $10 \leq s \leq 300$ seconds.

A secondary electrical system may include an electromagnetic wave generator.

Inside the secondary electrical system, an LC circuit resonant frequency may be adjusted by adjusting the inductance of an inductor or the capacitance of a capacitor or that of multiple inductors and/or capacitors connected in the dielectric heating circuit, the adjustment can be mechanically or electronically.

Dielectric heating may be initiated by the charging of the battery pack, wherein the charging station provides the power for the dielectric heating system allowing the battery pack to charge quickly Dielectric heating may be initiated by the depression of the acceleration pedal to provide an additional boost during electric vehicle acceleration.

Dielectric heating may be initiated by a temperature sensor in or around the electric vehicle to enable dielectric heating in cold weather.

The present description relates to fast charging of electric vehicles.

Internal heating of the electrolyte may be used to increase the charging rate of an electric vehicle. Internal heating of the electrolyte may also be used to decrease the charging duration of an electric vehicle.

Examples of internal heating processes may include, for example, resistive heating, induction heating, or dielectric heating; wherein the heating processes are used to heat elements embedded or suspended in the electrolyte.

Charging duration may have a range of $0.1 \leq t \leq 1440$ minutes, with a preferred range of $5 \leq t \leq 180$ minutes.

Charging stations may be used to charge electric vehicles.

A charging station may be used to supply current for resistive heating. It is expected that a secondary electrical system will control and distribute the current. Current may be direct current or alternating current for resistive heating. In the case of alternating current, the secondary electrical system may have a converter to generate direct current.

A charging station may be used to supply current for inductive heating. It is expected that a secondary electrical system will control and distribute the current. The delivered current may be direct or alternating. In the case of direct current, the secondary electrical system may have an inverter to generate alternating current.

A charging station may be used to supply current for dielectric heating. It is expected that a secondary electrical system will control the current. The delivered current may be direct or alternating. The secondary electrical system will use the current as a power source to generate the electromagnetic wave.

The charging station may be powered by, for example, the grid, solar panels, wind turbine, geothermal, etc.

Alternatively, an in-home charging unit may be used to charge electrics vehicles.

An in-home charging unit may be used supply current for resistive heating. It is expected that a secondary electrical system will control and distribute the current. Current may be direct current or alternating current for resistive heating. In the case of alternating current, the secondary electrical system may have a converter to generate direct current.

An in-home charging unit may be used to supply current for inductive heating. It is expected that a secondary electrical system will control and distribute the current. The delivered current may be direct or alternating. In the case of direct current, the secondary electrical system may have an inverter to generate alternating current.

An in-home charging unit may be used to supply current for dielectric heating. It is expected that a secondary electrical system will control the current. The delivered current may be direct or alternating. The secondary electrical system will use the current as a power source to generate the electromagnetic wave.

An in-home charging unit may be powered by, for example, the grid, solar panels, wind turbine, geothermal, etc.

The current may be from the same supplied current to charge the batteries. In this instance, a portion of the current is expected to be diverted from the battery charging system to the internal heating system through the secondary electrical system. Alternatively, the current may be a secondary current source direct from the charging station or in-home charging unit.

Internal heating may have a shut off switch. In this instance, the operator may choose to shut of the heating to conserve power at the expense of the charging rate.

The present description relates to acceleration of electric vehicles.

Internal heating of the electrolyte may be used to increase the acceleration rate of an electric vehicle. Examples of internal heating processes may include, for example, resistive heating, induction heating, or dielectric heating; wherein the heating processes are used to heat elements embedded or suspended in the electrolyte.

Internal heating of the electrolyte may be induced by the operator of the electric vehicle; wherein the operator depresses the accelerator pedal, and through a secondary electrical system, the depressing motion triggers the internal heating process.

In the case of resistive heating, when the accelerator pedal is pushed, a relay may divert current to the resistively heatable materials embedded inside the solid electrolyte. It is expected that a secondary electrical system will control and distribute the current.

The resistively heatable materials embedded in the solid electrolyte may raise the internal temperature of the solid electrolyte, thus increasing the ionic conductivity. The increased ionic conductivity may enable faster discharging rates of the solid-state batteries providing a power burst to the electric vehicle.

In the case of inductive heating, when the accelerator pedal is pushed, a relay may divert alternating current to the induction coils surrounding the batteries within a battery module. It is expected that a secondary electrical system will control and distribute the alternating current.

The alternating current may induce a magnetic field inside the induction coil. Eddy currents may then be generated inside the inductively heatable materials embedded or suspended in the electrolyte. The eddy currents may raise the internal temperature of the electrolyte, thus increasing the ionic conductivity. The increased ionic conductivity may enable faster discharging rates of the batteries providing a power burst to the electric vehicle.

In the case of dielectric heating, when the accelerator pedal is pushed, a relay may divert electromagnetic wave to the current collectors inside the electric vehicle batteries. It is expected that a secondary electrical system will control and administer the electromagnetic wave.

The electromagnetic wave with a specific frequency may go across the battery. The electromagnetic wave frequency is tuned to specifically heat the embedded high dielectric loss material embedded or suspended in the electrolyte, thus increasing the ionic conductivity. The increased ionic conductivity may enable faster discharging rates of the batteries providing a power burst to the electric vehicle.

The magnitude of current or electromagnetic wave, and duration thereof, may be governed by the accelerator pedal.

The magnitude of current or electromagnetic wave may be controlled by the degree of which the accelerator pedal is pushed. In this instance there is an amount of supplied current per degree. It is expected that the actual current or electromagnetic wave supplied to the internal heating system is controlled and distributed by a secondary electrical system and that the accelerator pedal only has a sensor controlling the input signal to the secondary electrical system.

The duration of current or electromagnetic wave may be controlled by the duration at which the accelerator pedal is pushed. It is expected that the actual magnitude supplied to the internal heating system is controlled and distributed by a secondary electrical system and that the accelerator pedal only has a sensor controlling the input signal to the secondary electrical system. The duration may have a max limit and may be shut off once a threshold is reached.

The current or electromagnetic wave parameters per degree that the accelerator pedal is pushed may change between different electric vehicle modes. For instance, sports mode may have a higher amount of magnitude per degree as opposed to normal or standard mode.

The magnitude of current or electromagnetic wave per degree may be set by the gear in which the electric vehicle is operating in.

Types of transmissions in said electric vehicle may include, for example, manual, automatic, or an automatic with a sports mode option.

The amount of current per degree may also be governed by the type of transmission and the gears thereof.

Internal heating may be used to increase the acceleration for the purposes of, for example, increasing speed, maneuvering over an incline, powering through rough terrain, carrying a heavy load, etc.

Internal heating may have a shut off switch. In this instance, the operator may choose to shut of the heating to conserve power at the expense of lower acceleration rates.

The present description relates to cold weather operation of electric vehicles.

Internal heating of the electrolyte may be used to enhance electric vehicle performance in cold weather. Examples of internal heating processes may include, for example, resistive heating, induction heating, or dielectric heating; wherein the heating processes are used to heat elements embedded or suspended in the electrolyte.

A temperature sensor may be used to monitor the temperature, when the temperature falls below a certain threshold, a relay is tripped, and internal heating may be enabled.

It is expected that a secondary electrical system will control and distribute the current to the internal heating systems. The temperature sensor will trip a temperature relay sending a signal to the secondary electrical system to enable the internal heating systems. The sensor may be positioned in locations of, for example, inside the battery module or battery modules, battery pack, or exterior of the electric vehicle.

A threshold may be set in the temperature range of $-50 \leq T \leq 60°$ C., with a preferred range of $-20 \leq T \leq 50°$ C.

An internal heating system may be used to heat the batteries in a rapid fashion in extreme cold weather conditions as a cold start mechanism.

An internal heating system may be used to heat the batteries to a sufficient operating temperature in extreme cold weather conditions.

An internal heating system may be used to heat the batteries to enable better electric vehicle performance in cold weather, and to enable fast charging and acceleration in cold weather.

Internal heating may have a shut off switch. In this instance, the operator may choose to shut of the heating to conserve power at the expense of electric vehicle performance.

The drawings of the present description further describe examples of how the resistive, inductive, and dielectric heating processes enable fast charging and acceleration of the electric vehicle. The present disclosure is not limited to these examples.

FIG. 1: A schematic illustration of an internal heatable battery system in the form of an electric vehicle having solid-state batteries. In alternative embodiments, the electric vehicle may include batteries with liquid electrolytes. As shown in FIG. 1, the electric vehicle includes a solid-state battery pack (032), which comprises a plurality of solid-state battery modules (030). The solid-state battery modules (030) each include a plurality of solid-state batteries (028). Although not shown, the solid-state battery pack (032) may be connected to typical components of an electric vehicle, such as a motor for accelerating the electric vehicle. The solid-state batteries (028) may be charged through a charging port (098), which is configured to connect with a charging station (not shown). The solid-state battery pack (032) may be connected to the charging port via solid-state battery charging pathway (018). The solid-state battery pack (032) may be connected to a secondary electrical system (024) for heating the electrolyte of the solid-state batteries (028) via first heating electrical circuit pathway (026, 042, 048) and second heating electrical circuit pathway (026, 042, 050). The secondary electrical system (024) represents a resistive heater, an induction heater, or a dielectric heating depending on the heating method for heating the electrolyte. FIG. 1 further shows the secondary electrical system (024) connected to the charging port (098) via internal heating electrical pathway (022), to an accelerator (056) via transient signal pathway (068), and to a temperature sensor (072) and a relay (074) via electrical temperature sensing pathway (084).

Figure 2A:
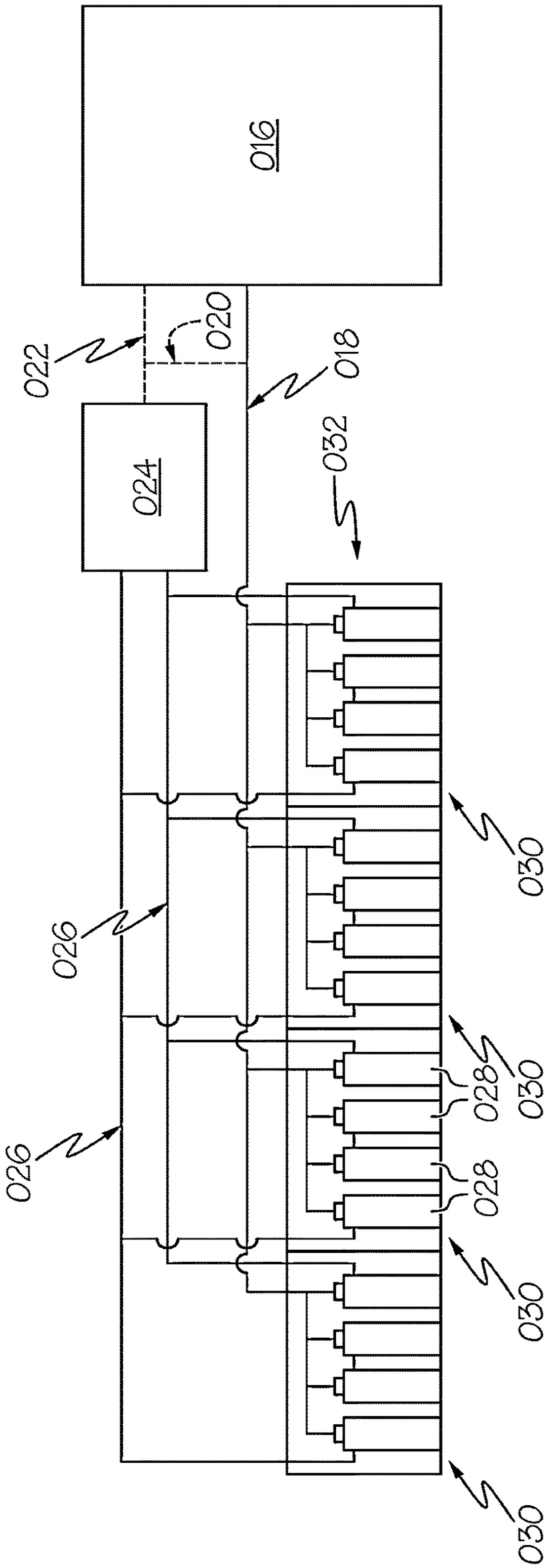
FIGS. 2A and 2B: A schematic illustration of resistive heating for fast charging in electric vehicles.
Figure 2B:
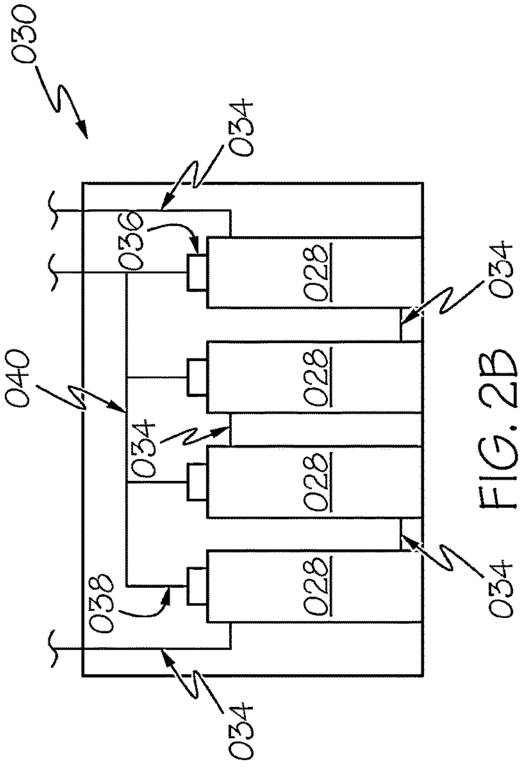

FIGS. 2A and 2B: A schematic illustration of resistive heating for fast charging in electric vehicles, wherein a charging station (016) supplies current through an internal heating electrical pathway (022) to a secondary electrical system (024). Alternatively, current may be supplied through the solid-state battery charging pathway (018), where it can be diverted into a secondary pathway (020) leading to the secondary electrical system (024). Current for resistive heating may be supplied to solid-state battery modules (030), located in a solid-state battery pack (032), from the secondary electrical system (024) through the resistive heating electrical circuit pathway (026). Current is supplied to the individual solid-state battery cells (028) through resistive heating leads (034), which may be connected to neighboring solid-state battery cells in a series circuit. The schematic further illustrates how the resistive heating circuit is independent of the charging circuit (040), with leads (038) connected to the battery terminals (036).

Figure 3A:
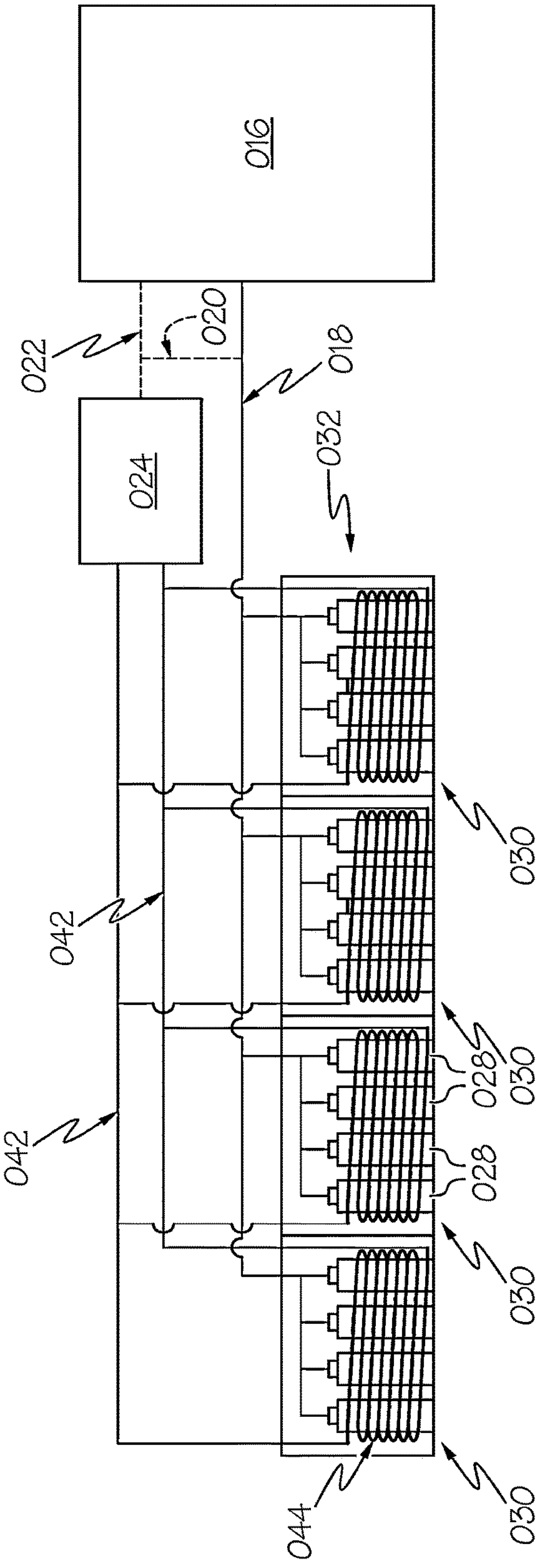
FIGS. 3A and 3B: A schematic illustration of inductive heating for fast charging in electric vehicles.
Figure 3B:
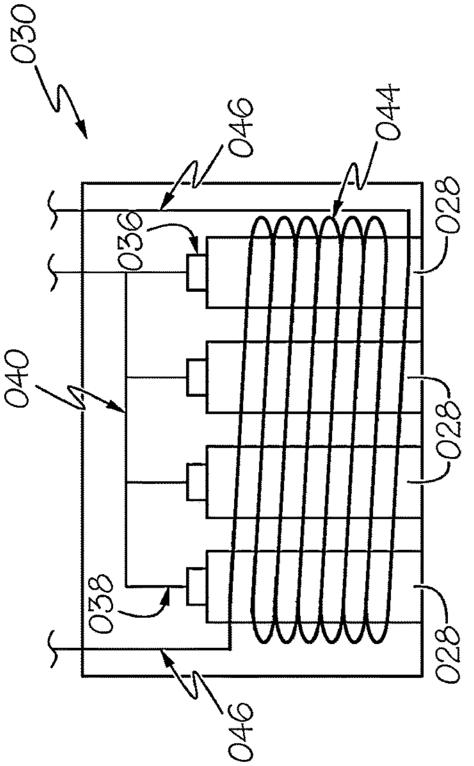

FIGS. 3A and 3B: A schematic illustration of inductive heating for fast charging in electric vehicles, wherein a charging station (016) supplies current through an internal heating electrical pathway (022) to a secondary electrical system (024). Alternatively, current may be supplied through the liquid or solid-state battery charging pathway (018), where it can be diverted into a secondary pathway (020) leading to the secondary electrical system (024). Alternating current for inductive heating may be supplied to the induction coils (044), through induction coil leads (046), from the secondary electrical system (024) through the inductive heating electrical circuit pathway (042). A single induction coil (044) may be positioned around all of the liquid or solid-state battery cells (028) of a liquid or solid-state battery module (030), located in a liquid or solid-state battery pack (032). The schematic further illustrates how the inductive heating circuit is independent of the charging circuit (040), with leads (038) connected to the battery terminals (036). The secondary electrical system (024) may control the duration and or the pulsation of the alternating current.

Figure 4A:
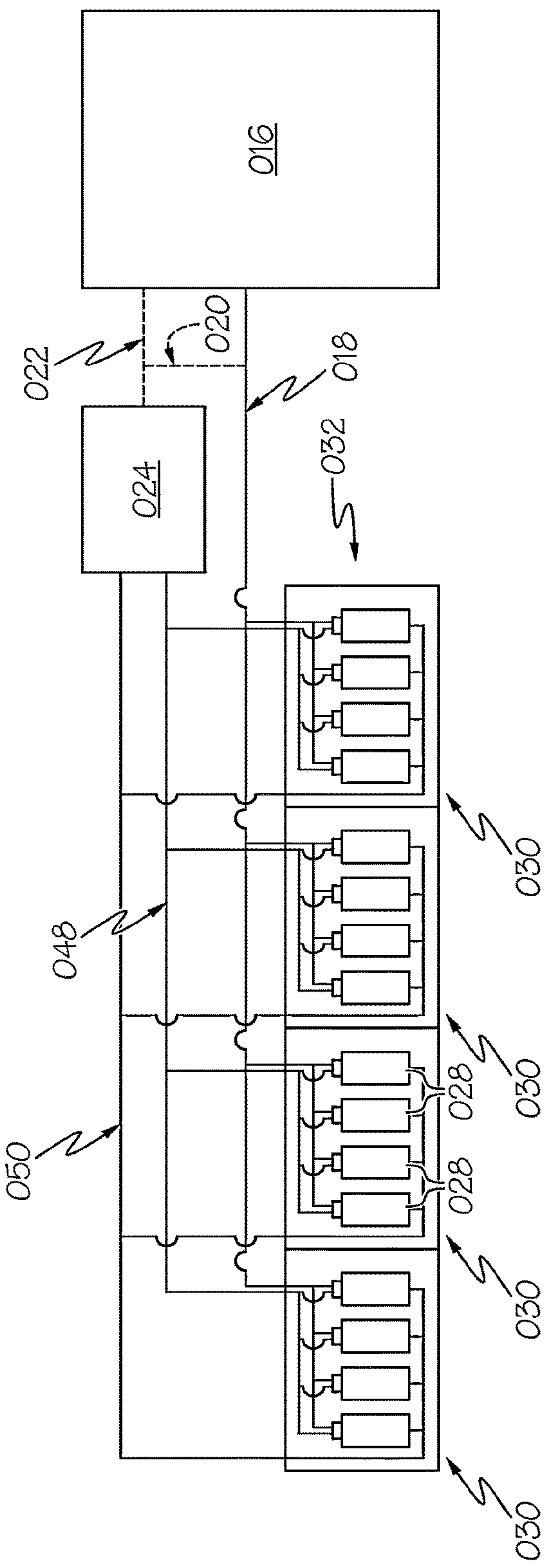
FIGS. 4A and 4B: A schematic illustration of dielectric heating for fast charging in electric vehicles.
Figure 4B:
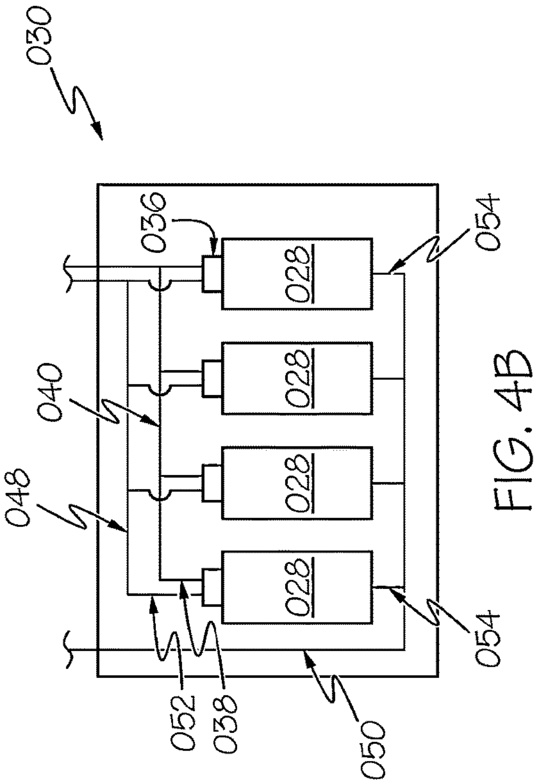

FIGS. 4A and 4B: A schematic illustration of dielectric heating for fast charging in electric vehicles, wherein a charging station (016) supplies current through an internal heating electrical pathway (022) to a secondary electrical system (024). Alternatively, the current may be supplied through the liquid or solid-state battery charging pathway (018), where it can be diverted into a secondary pathway (020) leading to the secondary electrical system (024). The electromagnetic wave, generated by the secondary electrical system, may be supplied to the liquid or solid-state battery cells (028) of each liquid or solid-state battery module (030), located in a liquid or solid-state battery pack (032). An electromagnetic wave may be applied to the positive current collectors of the liquid or solid-state battery cells through positive leads (052) connected to a positive electrical circuit (048). An electromagnetic wave may be applied to the negative current collectors of the liquid or solid-state battery cells through negative leads (054) connected to a negative electrical circuit (050). The schematic further illustrates how the dielectric heating circuit is independent of the charging circuit (040), with leads (038) connected to the battery terminals (036).

Figure 5A:
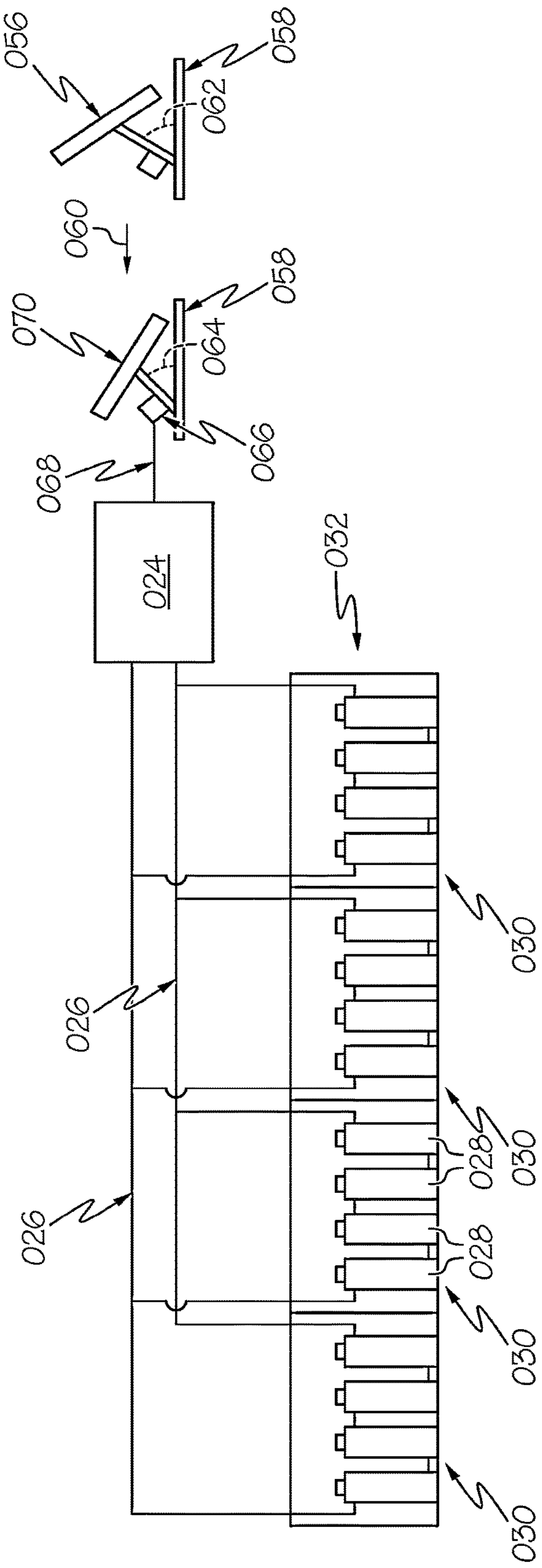
FIGS. 5A and 5B: A schematic illustration of resistive heating for acceleration in electric vehicles.
Figure 5B:
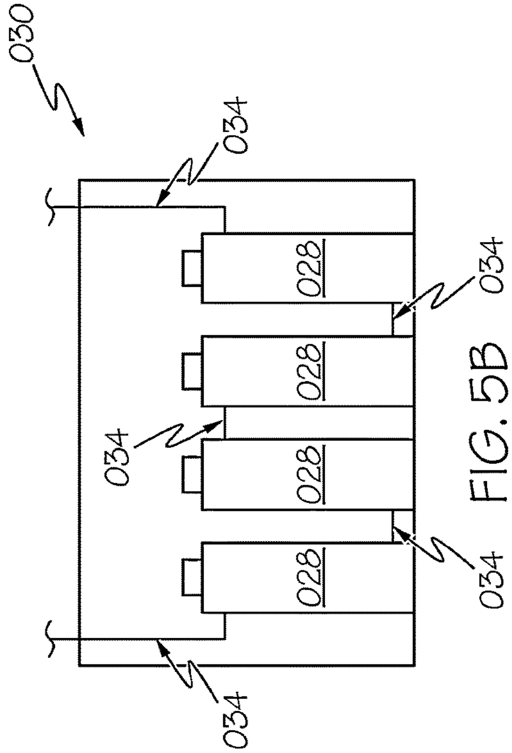

FIGS. 5A and 5B: A schematic illustration of resistive heating for acceleration in electric vehicles, wherein a transient input signal is sent to the secondary electrical system (024) through a transient signal pathway (068) connected to an accelerator sensor (066) positioned onto the accelerator. The accelerator sensor (066) is in the off mode when the accelerator is in the idle position (056) and the accelerator angle, with respect to the cabin floor (058), is at the idle angle (062). When the accelerator is depressed (070) during acceleration (060), the acceleration angle (064) trips the accelerator sensor (066) sending a transient signal to the secondary electrical system (024) turning the internal heating process on. Current for resistive heating may be supplied to the solid-state battery modules (030), located in a solid-state battery pack (032), from the secondary electrical system (024) through the resistive heating electrical circuit pathway (026). Current is supplied to the individual solid-state battery cells (028) through resistive heating leads (034), which may be connected to neighboring solid-state battery cells (028) in a series circuit. The secondary electrical system (024) may be connected to an external power source (not shown) to provide the necessary power for resistive heating.

Figure 6A:
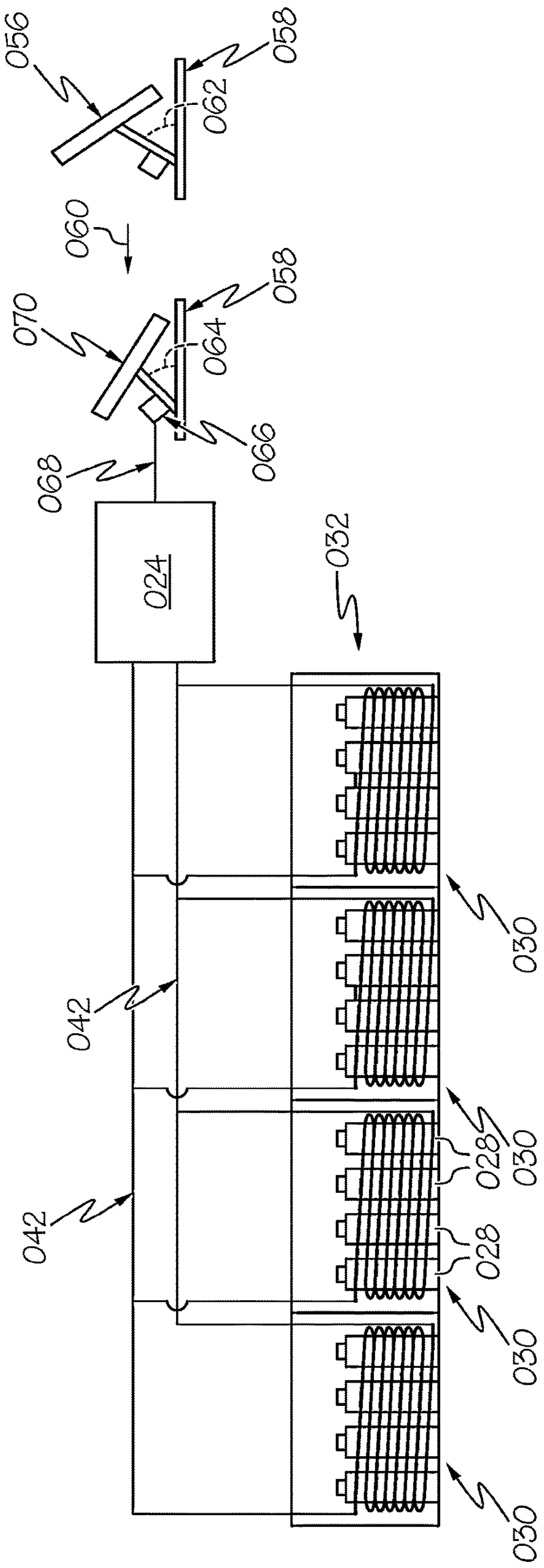
FIGS. 6A and 6B: A schematic illustration of inductive heating for acceleration in electric vehicles.
Figure 6B:
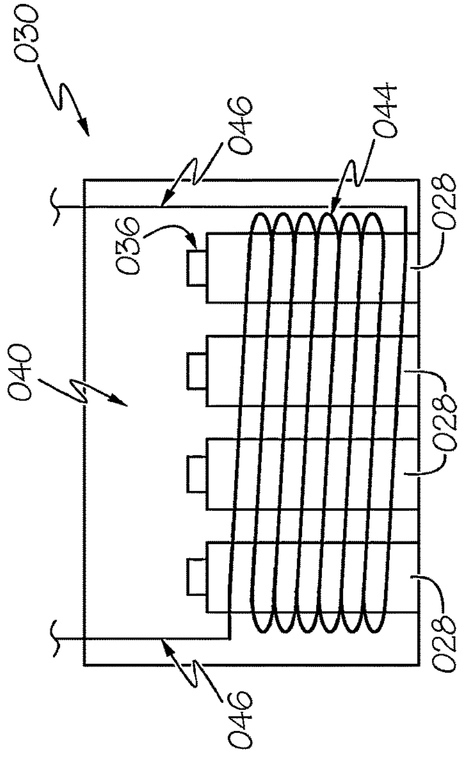

FIGS. 6A and 6B: A schematic illustration of inductive heating for acceleration in electric vehicles, wherein a transient input signal is sent to the secondary electrical system (024) through a transient signal pathway (068) connected to an accelerator sensor (066) positioned onto the accelerator. The accelerator sensor (066) is in the off mode when the accelerator is in the idle position (056) and the accelerator angle, with respect to the cabin floor (058), is at the idle angle (062). When the accelerator is depressed (070) during acceleration (060), the acceleration angle (064) trips the accelerator sensor (066) sending a transient signal to the secondary electrical system (024) turning the internal heating process on. Alternating current for inductive heating may be supplied to the induction coils (044), through induction coil leads (046), from the secondary electrical system (024) through the inductive heating electrical circuit pathway (042). A single induction coil (044) may be positioned around all of the liquid or solid-state battery cells (028) of a liquid or solid-state battery module (030), located in a liquid or solid-state battery pack (032). The secondary electrical system (024) may be connected to an external power source (not shown) to provide the necessary power for inductive heating. The secondary electrical system (024) may control the duration and or the pulsation of the alternating current.

Figure 7A:
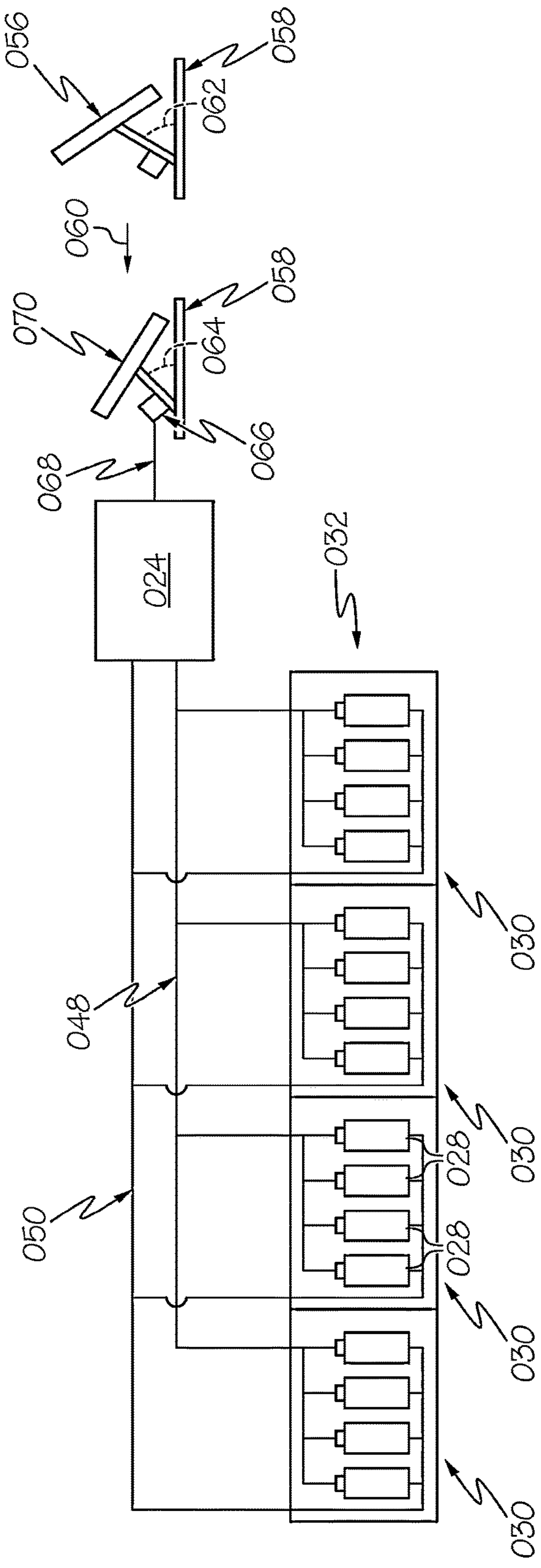
FIGS. 7A and 7B: A schematic illustration of dielectric heating for acceleration in electric vehicles.
Figure 7B:
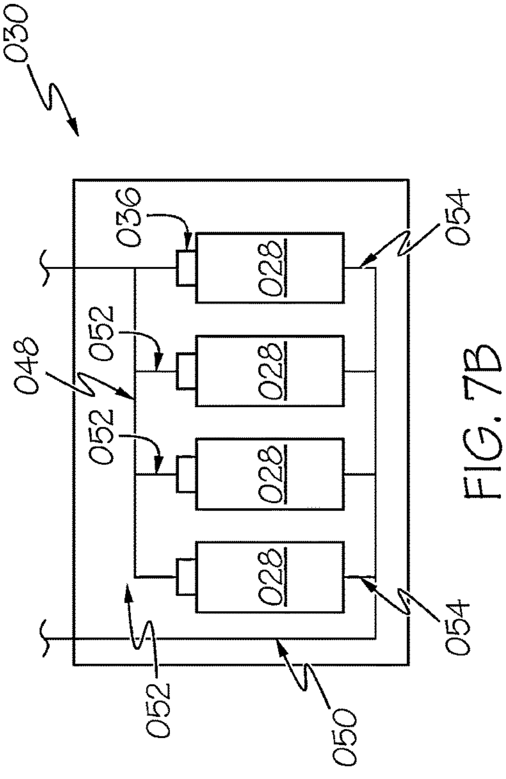

FIGS. 7A and 7B: A schematic illustration of dielectric heating for acceleration in electric vehicles, wherein a transient input signal is sent to the secondary electrical system (024) through a transient signal pathway (068) connected to an accelerator sensor (066) positioned onto the accelerator. The accelerator sensor (066) is in the off mode when the accelerator is in the idle position (056) and the accelerator angle, with respect to the cabin floor (058), is at the idle angle (062). When the accelerator is depressed (070) during acceleration (060), the acceleration angle (064) trips the accelerator sensor (066) sending a transient signal to the secondary electrical system (024) turning the internal heating process on. An electromagnetic wave, generated by the secondary electrical system, may be supplied to the liquid or solid-state battery cells (028) of each liquid or solid-state battery module (030), located in a liquid or solid-state battery pack (032). An electromagnetic wave may be applied to the positive current collectors of the liquid or solid-state battery cells through positive leads (052) connected to a positive electrical circuit (048). An electromagnetic wave may be applied to the negative current collectors of the liquid or solid-state battery cells through negative leads (054) connected to a negative electrical circuit (050). The secondary electrical system (024) may be connected to an external power source (not shown) to provide the necessary power for dielectric heating.

Figure 8A:
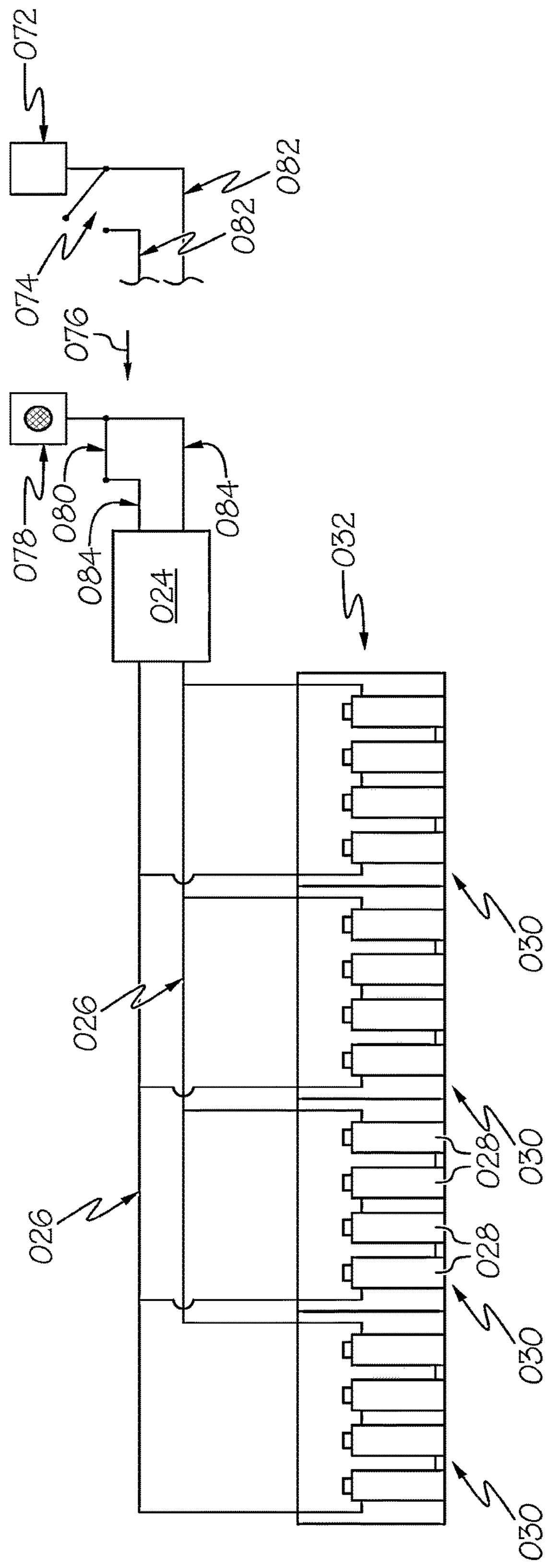
FIGS. 8A and 8B: A schematic illustration of a temperature sensor system initiating resistive heating in an electric vehicle during cold weather.
Figure 8B:
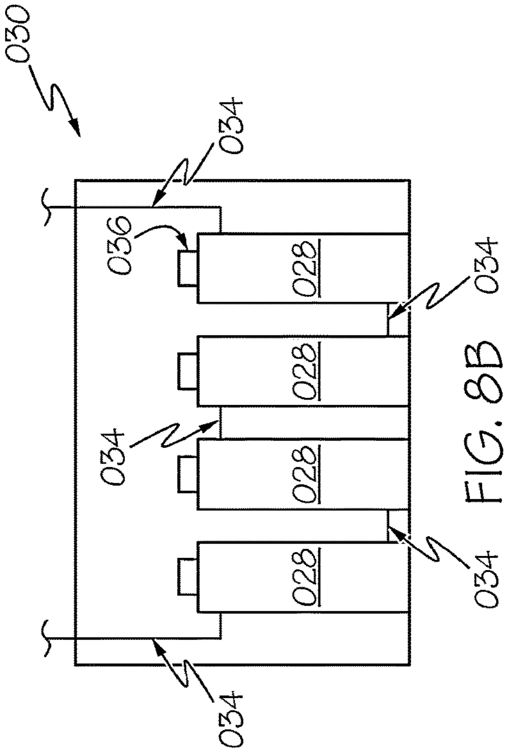

FIGS. 8A and 8B: A schematic illustration of a temperature sensor system initiating resistive heating in an electric vehicle, wherein a temperature sensor (072) and a relay (074) are in the off position when the ambient temperature is above the threshold. The temperature sensor (072) and the relay (074) are connected to the secondary electrical system (024) through an open electrical temperature sensing pathway (082). When the ambient temperature drops below the threshold (076), the temperature sensor is activated (078), dropping the relay (080) closing the electrical temperature sensing pathway (084) and initiating the internal heating process. Current for resistive heating may be supplied to the solid-state battery modules (030), located in a solid-state battery pack (032), from the secondary electrical system (024) through the resistive heating electrical circuit pathway (026). Current is supplied to the individual solid-state battery cells (028) through resistive heating leads (034), which may be connected to neighboring solid-state battery cells (028) in a series circuit. The secondary electrical system (024) may be connected to an external power source (not shown) to provide the necessary power for resistive heating.

Figure 9A:
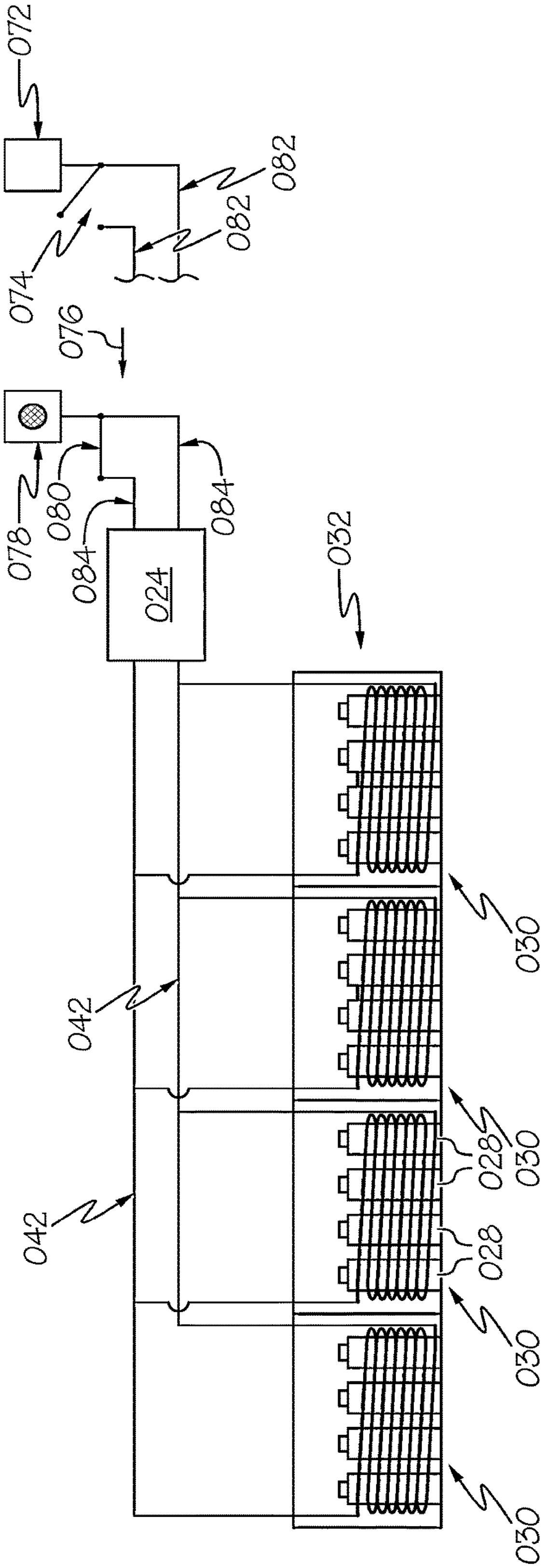
FIGS. 9A and 9B: A schematic illustration of a temperature sensor system initiating induction heating in an electric vehicle during cold weather.
Figure 9B:
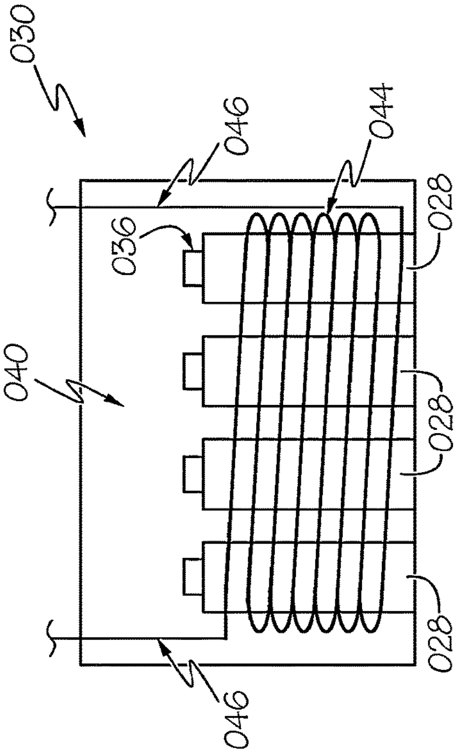

FIGS. 9A and 9B: A schematic illustration of a temperature sensor system initiating induction heating in an electric vehicle, wherein a temperature sensor (072) and a relay (074) are in the off position when the ambient temperature is above the threshold. The temperature sensor (072) and the relay (074) are connected to the secondary electrical system (024) through an open electrical temperature sensing pathway (082). When the ambient temperature drops below the threshold (076), the temperature sensor is activated (078), dropping the relay (080) closing the electrical temperature sensing pathway (084) and initiating the internal heating process. Alternating current for inductive heating may be supplied to the induction coils (044), through induction coil leads (046), from the secondary electrical system (024) through the inductive heating electrical circuit pathway (042). A single induction coil (044) may be positioned around all of the liquid solid-state battery cells (028) of a liquid or solid-state battery module (030), located in a liquid or solid-state battery pack (032). The secondary electrical system (024) may be connected to an external power source (not shown) to provide the necessary power for inductive heating. The secondary electrical system (024) may control the duration and or the pulsation of the alternating current.

Figure 10A:
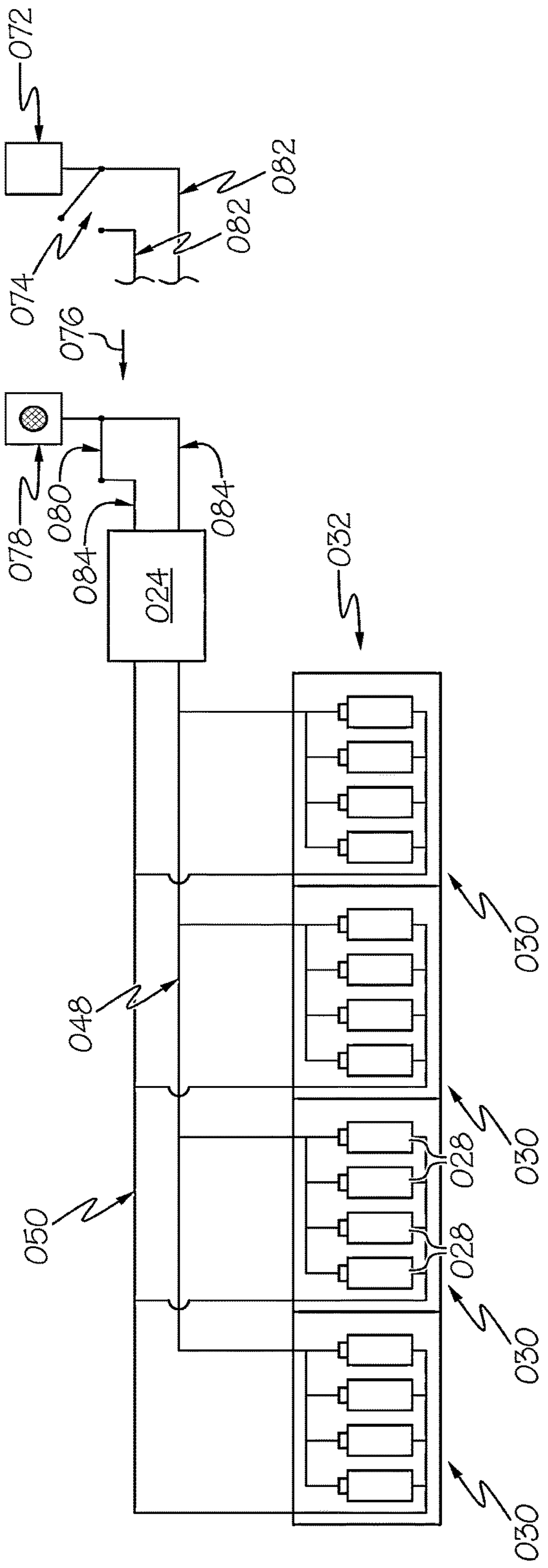
FIGS. 10A and 10B: A schematic illustration of a temperature sensor system initiating dielectric heating in an electric vehicle during cold weather.
Figure 10B:
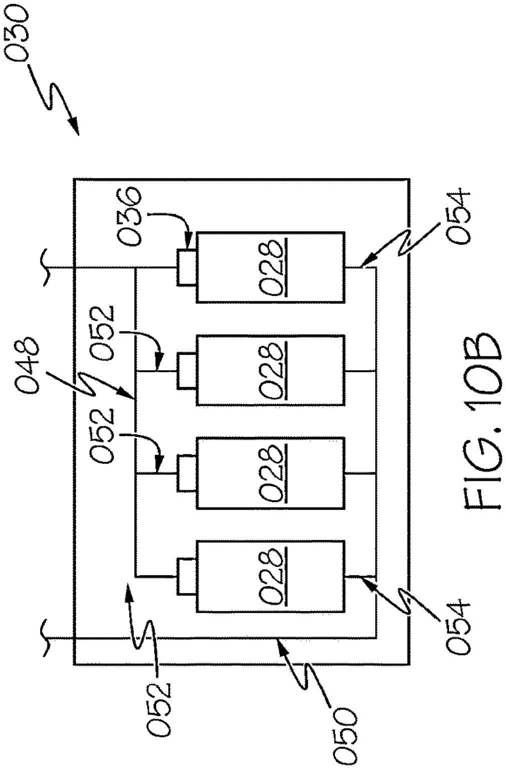

FIGS. 10A and 10B: A schematic illustration of a temperature sensor system initiating dielectric heating in an electric vehicle, wherein a temperature sensor (072) and a relay (074) are in the off position when the ambient temperature is above the threshold. The temperature sensor (072) and the relay (074) are connected to the secondary electrical system (024) through an open electrical temperature sensing pathway (082). When the ambient temperature drops below the threshold (076), the temperature sensor is activated (078), dropping the relay (080) closing the electrical temperature sensing pathway (084) and initiating the internal heating process. The electromagnetic wave, generated by the secondary electrical system, may be supplied to the liquid or solid-state battery cells (028) of each liquid or solid-state battery module (030), located in a liquid or solid-state battery pack (032). An electromagnetic wave may be applied to the positive current collectors of the liquid or solid-state battery cells through positive leads (052) connected to a positive electrical circuit (048). An electromagnetic wave may be applied to the negative current collectors of the liquid or solid-state battery cells through negative leads (054) connected to a negative electrical circuit (050). The secondary electrical system (024) may be connected to an external power source (not shown) to provide the necessary power for dielectric heating.

Figure 11:
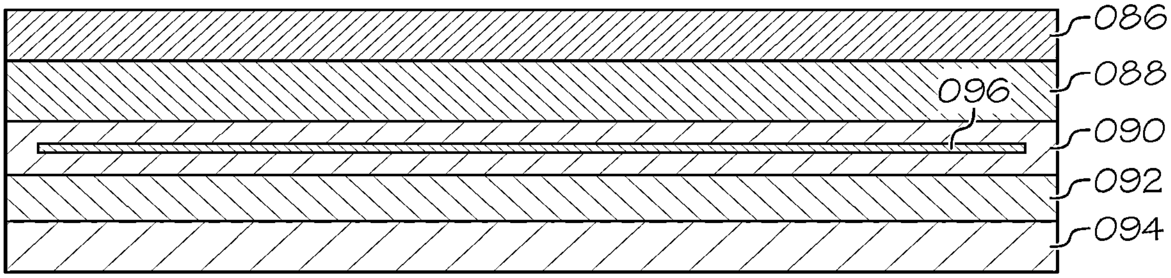
FIG. 11: A schematic illustration of a cross-sectional of a battery, particularly an exemplary solid-state battery.

FIG. 11: A schematic illustration of a cross-sectional of a battery, particularly an exemplary solid-state battery. As shown in FIG. 11, the solid-state battery includes: a solid anode current collector layer (086); a solid anode active material layer (088) directly on the anode current collector layer (086); a solid electrolyte layer (090) directly adjacent to the anode active material layer (088), wherein optionally a liquid electrolyte may be disposed between the anode active material layer (088) and the solid electrolyte layer (090); a solid cathode active material layer (092) directly adjacent to solid electrolyte layer (090), wherein optionally a liquid electrolyte may be disposed between the solid electrolyte layer (090) and the anode active material layer (092); and a solid cathode current collector layer (094) directly on the cathode active material layer (092). As shown, the solid electrolyte layer (090) may include fabric support or heatable material (096). The solid electrolyte may include: a solid ionic conductive matrix comprising at least one of (i) a solid ionic conductive polymer (i) a solid ionic conductive ceramic, and (iii) an ionic conductive salt; and at least one heatable material embedded in the ionic conductive matrix.

Figure 12A:
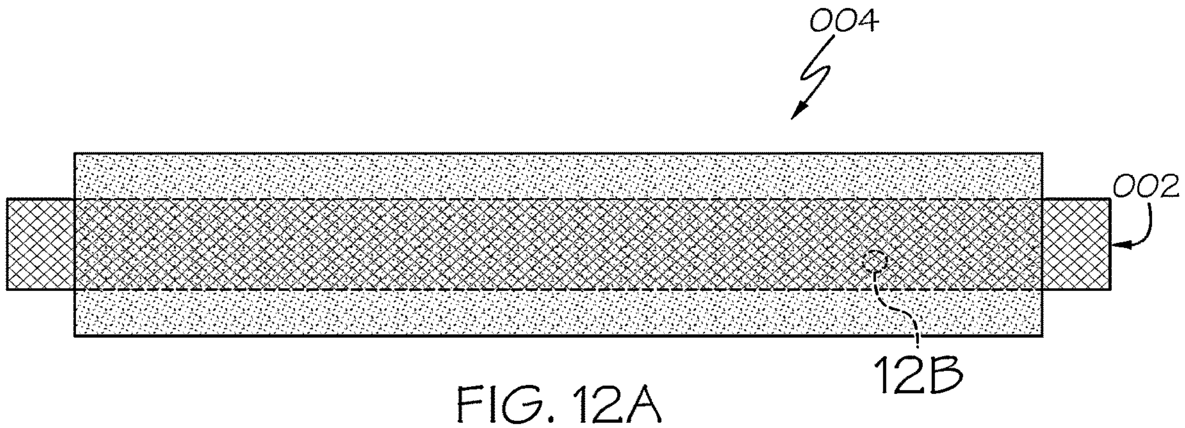
FIGS. 12A and 12B: A schematic illustration of a cross-sectional view of the ceramic-polymer composite solid electrolyte supported on textile-based fabric support.
Figure 12B:
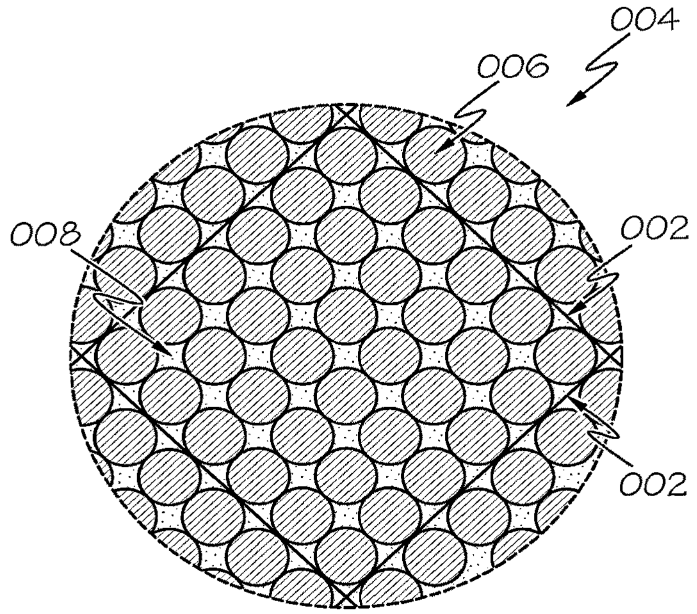

FIGS. 12A and 12B: A schematic illustration of a cross-sectional view of the ceramic-polymer composite solid electrolyte supported on fabric support; wherein the solid electrolyte (004) is composed of an ionic conducting ceramic (006) and a polymer/ionic conducting salt matrix (008) supported on a textile-based fabric support (002). The solid electrolyte may be dielectrically heatable in the case that the internal heating method is dielectric heating. In an alternative, the solid electrolyte (004) may be replaced with a liquid or gel electrolyte.

Figure 13A:
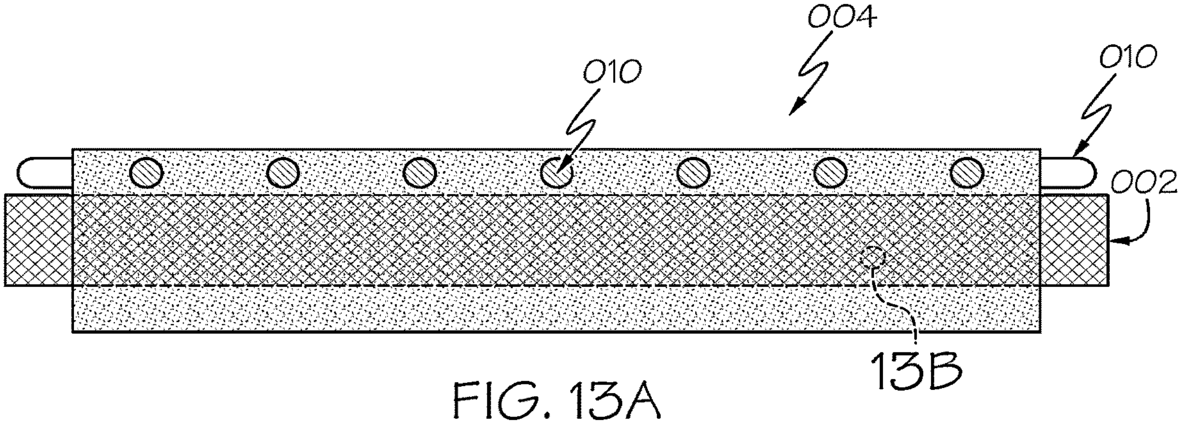
FIGS. 13A and 13B: A schematic illustration of a cross-sectional view of wires or fibers embedded in a ceramic-polymer composite solid-state electrolyte supported on a textile-based fabric support.
Figure 13B:
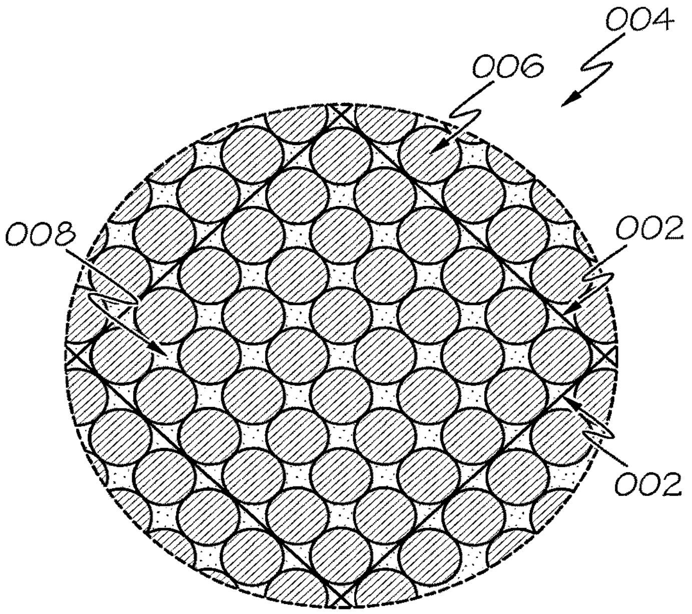

FIGS. 13A and 13B: A schematic illustration of a cross-sectional view of wires or fibers embedded in a ceramic-polymer composite solid-state electrolyte supported on a fabric support, wherein in the wires or fibers (010) are in the form of a screen or mesh embedded in the solid electrolyte (004) and supported on a textile-based fabric support (002). The composition of the wires or fibers (010) is dependent on the internal heating process which may include, for example, resistive heating, induction heating, or dielectric heating. In the case of resistive or inductive heating, the wires or fibers (010), which may be in the form of a screen or mesh, are preferably coated with an electrically insulative coating to avoid electrically shorting the anode and cathode and to avoid reaction between the heatable materials and other components of the battery. In an alternative, the solid electrolyte (004) may be replaced with a liquid or gel polymer electrolyte.

Figure 14A:
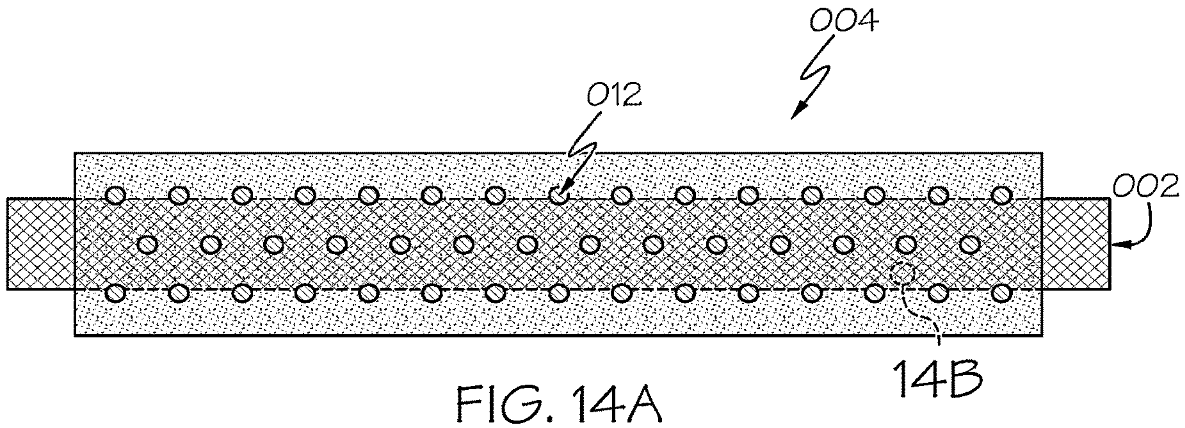
FIGS. 14A and 14B: A schematic illustration of a cross-sectional view of materials embedded in a ceramic-polymer composite solid-state electrolyte supported on a textile-based fabric support.
Figure 14B:
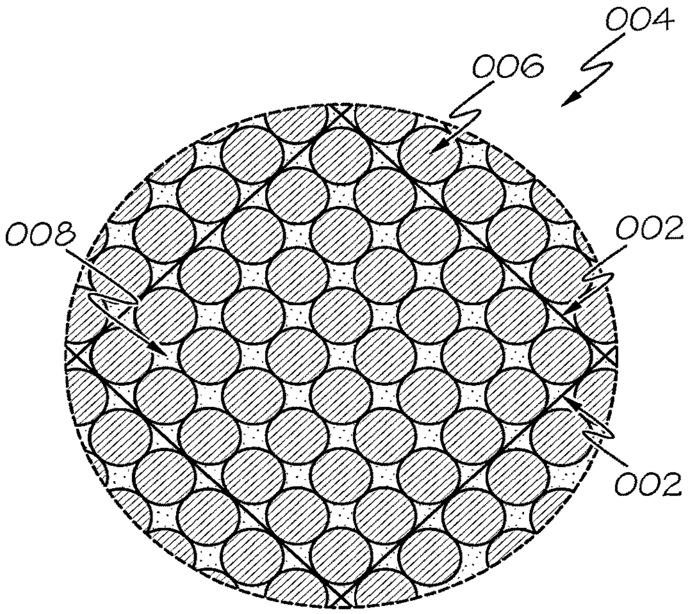

FIGS. 14A and 14B: A schematic illustration of a cross-sectional view of materials embedded in a ceramic-polymer composite solid-state electrolyte supported on a fabric support, wherein the materials (012) are embedded throughout the solid electrolyte (004) and supported on a textile-based fabric support (002). The composition of the materials (012) is dependent on the internal heating process which may include, for example, induction or dielectric heating. In an alternative, the solid electrolyte (004) may be replaced with a liquid or gel polymer electrolyte.

Figure 15A:
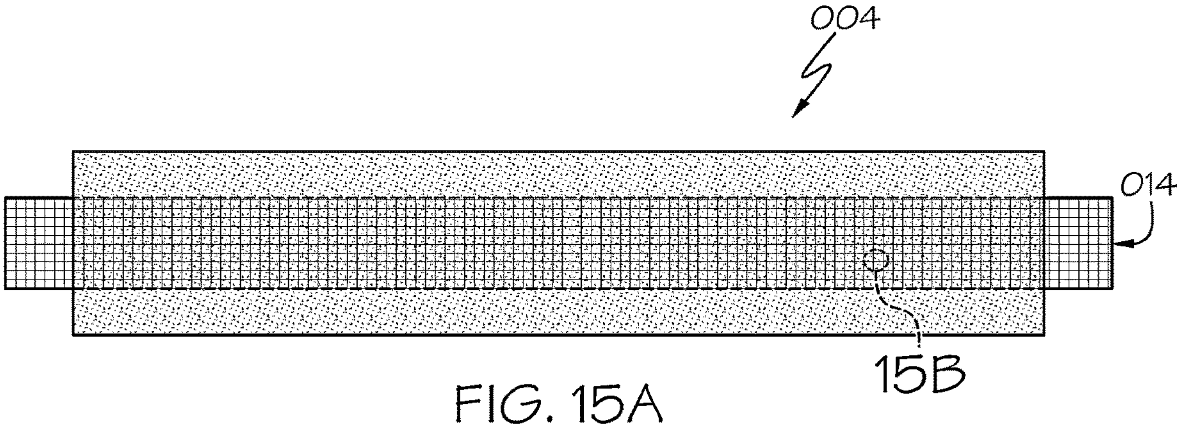
FIGS. 15A and 15B: A schematic illustration of a cross-sectional view of a ceramic-polymer composite solid electrolyte supported on a metal mesh-based fabric support.
Figure 15B:
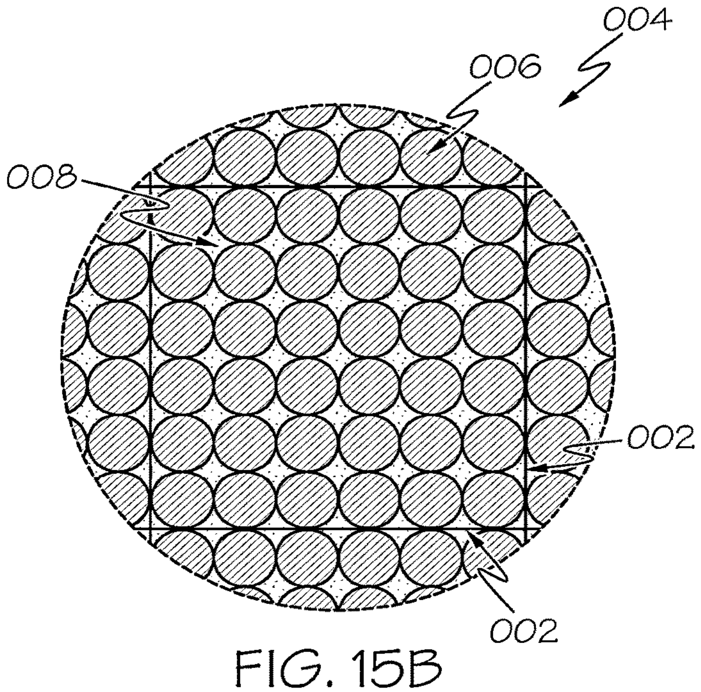

FIGS. 15A and 15B: A schematic illustration of a cross-sectional view of a ceramic-polymer composite solid electrolyte supported on a fabric support; wherein the solid electrolyte (004) is supported on a metal mesh-based fabric support (014) which is used as the heating element. The composition of the metal mesh-based fabric support (014) is dependent on the internal heating process which may include, for example, resistive or inductive heating. The metal mesh-based fabric is preferably coated with an electrically insulative coating to avoid electrically shorting the anode and cathode and to avoid reaction between the heatable materials and other components of the battery. In an alternative, the solid electrolyte (004) may be replaced with a liquid or gel polymer electrolyte.

With reference to the drawings, examples of electrochemical energy storage systems with inductively heatable materials embedded in the electrolyte may include the following.

Example 1: In an example, resistive heating of wires or fibers embedded in a solid electrolyte may be used to enable fast charging, acceleration, and cold temperature operation of electric vehicles. A solid electrolyte may include a ceramic-polymer composite composed of a ceramic ionic conductor such as NASICON-type LAGP and an ionic conducting polymer such as poly(ethylene oxide) (PEO). The ceramic-polymer composite may be supported on a nonwoven textile-based fabric support composed of cellulose fibers. Resistively heatable wires or fibers composed of copper microwires, in the form of a screen or mesh, and coated (e.g. conformally coated) with a thin layer of an electrically and/or ionically, insulative metal oxide, are embedded in the ceramic-polymer composite and supported onto the nonwoven fabric support. The resistive heating screen or mesh is connected in series to two leads exiting the solid-state battery which may be connected to leads of neighboring solid-state batteries within a solid-state battery module. The resistive heating circuit in the solid-state battery module is connected to the secondary electrical system of the electric vehicle. Current is supplied to the resistively heatable wires or fibers when the resistive heating process is initiated by either electric vehicle charging, acceleration, cold weather activation, or a combination thereof. An external power source, such as a charging station for electric vehicle charging, or an onboard supercapacitor system for electric vehicle acceleration or cold weather operation, may be used to power the resistive heating system.

Example 2: In an example, resistive heating of a metal mesh-based fabric support may be used to enable fast charging, acceleration, and cold temperature operation of electric vehicles. A solid electrolyte may include a ceramic-polymer composite composed of a ceramic ionic conductor such as an argyrodite and a nonionic conducting polymer such as nitrile rubber (NBR). The ceramic-polymer composite may be supported on a metal mesh-based fabric support such as ultrathin copper foam coated (e.g. conformally coated) with an electrically and/or ionically insulative polymer layer. The resistive heating copper foam may be connected in series to two leads exiting the solid-state battery which may be connected to leads of neighboring solid-state batteries within a solid-state battery module. The resistive heating circuit in the solid-state battery module is connected to the secondary electrical system of the electric vehicle. Current is supplied to the resistive heating copper foam when the resistive heating process is initiated by either electric vehicle charging, acceleration, cold weather activation, or a combination thereof. An external power source, such as a charging station for electric vehicle charging, or an internal power source such as the solid-state batteries themselves, for electric vehicle acceleration or cold weather operation, may be used to power the resistive heating system.

Example 3: In an example, induction heating of inductively heatable wires or fibers embedded in the solid electrolyte may be used to enable fast charging, acceleration, and cold temperature operation of electric vehicles. A solid electrolyte may include a ceramic-polymer composite composed of a ceramic ionic conductor such as an garnet-structure LLZO and a nonionic conducting polymer such as polyvinylidene fluoride (PVDF). The ceramic-polymer composite may be supported on a textile-based fabric support composed of glass fibers. Inductively heatable wires or fibers composed of carbon tubes, coated (e.g. conformally coated) with an electrically insulative polymer layer, and laid parallel to on another, are embedded in the ceramic-polymer composite and supported onto the nonwoven fabric support. In an alternative, the ceramic-polymer composite solid electrolyte may be replaced with a liquid or gel polymer electrolyte. Alternating current is supplied to the induction coil, that surrounds the solid-state batteries in the solid-state battery module, from secondary electrical system. The supply of alternating current is initiated by either electric vehicle charging, acceleration, cold weather activation, or a combination thereof. The alternating current, either pulsed or continuous, generates a magnetic field within the induction coil, which in turn generates eddy currents inside the carbon tubes heating the solid electrolyte. An external power source, such as a charging station for electric vehicle charging, or an onboard secondary battery system for electric vehicle acceleration or cold weather operation, may be used to power the inductive heating system.

Example 4: In an example, induction heating of inductively heatable materials embedded in the solid electrolyte may be used to enable fast charging, acceleration, and cold temperature operation of electric vehicles. A solid electrolyte may include a ceramic-polymer composite composed of a ceramic ionic conductor such as an anti-perovskite material $Li_3OX$ (X=Cl, Br, I) and an ionic conducting polymer such as polyacrylonitrile (PAN). The ceramic-polymer composite may be supported on a textile-based fabric support composed of nonwoven cotton. Inductively heatable materials composed of magnetite are embedded in the ceramic-polymer composite and supported onto the nonwoven cotton. In an alternative, the ceramic-polymer composite solid electrolyte may be replaced with a liquid or gel polymer electrolyte. Alternating current is supplied to the induction coil, that surrounds the solid-state batteries in the solid-state battery module, from secondary electrical system. The supply of alternating current is initiated by either electric vehicle charging, acceleration, cold weather activation, or a combination thereof. The alternating current, either pulsed or continuous, generates a magnetic field within the induction coil, which in turn generates eddy currents inside the magnetite heating the solid electrolyte. An external power source, such as a charging station for electric vehicle charging, or an onboard supercapacitor system for electric vehicle acceleration or cold weather operation, may be used to power the inductive heating system.

Example 5: In an example, induction heating of an inductively heatable metal mesh-based fabric support may be used to enable fast charging, acceleration, and cold temperature operation of electric vehicles. A solid electrolyte may include a ceramic-polymer composite composed of a ceramic ionic conductor such as argyrodite and an ionic conducting polymer such as poly(ethylene oxide) (PEO). The ceramic-polymer composite may be supported on a metal mesh-based fabric support such as ultra-thin nickel foam coated (e.g. conformally coated) with a thin electrically insulative layer of polymer. In an alternative, the ceramic-polymer composite solid electrolyte may be replaced with a liquid or gel polymer electrolyte. Alternating current is supplied to the induction coil, that surrounds the solid-state batteries in the solid-state battery module, from secondary electrical system. The supply of alternating current is initiated by either electric vehicle charging, acceleration, cold weather activation, or a combination thereof. The alternating current, either pulsed or continuous, generates a magnetic field within the induction coil, which in turn generates eddy currents inside the nickel foam heating the solid electrolyte. An external power source, such as a charging station for electric vehicle charging, or an onboard capacitor system for electric vehicle acceleration or cold weather operation, may be used to power the inductive heating system.

Example 6: In an example, dielectric heating of electrically insulative wires or fibers may be used to enable fast charging, acceleration, and cold temperature operation of electric vehicles. A solid electrolyte may include a ceramic-polymer composite composed of a ceramic ionic conductor such as NASICON-type LATP and a nonionic conducting polymer such as polyvinylidene fluoride (PVDF). The ceramic-polymer composite may be supported on a textile-based fabric support composed of cellulose fibers. Electrically insulative heatable wires or fibers composed of poly (vinylidene chloride) (PVDC), laid parallel to on another, are embedded in the ceramic-polymer composite and supported onto the nonwoven fabric support. In an alternative, the ceramic-polymer composite solid electrolyte may be replaced with a liquid or gel polymer electrolyte. The electromagnetic wave is applied to the positive and negative current collectors generating an electromagnetic field or wave across the solid-state battery. The electromagnetic wave is initiated by either electric vehicle charging, acceleration, cold weather activation, or a combination thereof. The electromagnetic wave generates heat inside the PVDC heating the solid electrolyte. An external power source, such as a charging station for electric vehicle charging, or an onboard secondary battery system for electric vehicle acceleration or cold weather operation, may be used to power the dielectric heating system.

Example 7: In an example, dielectric heating of electrically insulative materials embedded in the solid electrolyte may be used to enable fast charging, acceleration, and cold temperature operation of electric vehicles. A solid electrolyte may include a ceramic-polymer composite composed of a ceramic ionic conductor such as garnet-structure LLZO and a nonionic conducting polymer such as nitrile rubber (NBR). The ceramic-polymer composite may be supported on a textile-based fabric support composed of cheesecloth. Electrically insulative heatable materials composed of barium strontium titanate ($Ba_{1-x}Sr_xTiO_3$), are embedded in the ceramic-polymer composite. In an alternative, the ceramic-polymer composite solid electrolyte may be replaced with a liquid or gel polymer electrolyte. An electromagnetic wave is applied to the positive and negative current collectors generating an electromagnetic field or wave across the solid-state battery. The electromagnetic wave is initiated by either electric vehicle charging, acceleration, cold weather activation, or a combination thereof. The electromagnetic wave generates heat inside the barium strontium titanate heating the solid electrolyte. An external power source, such as a charging station for electric vehicle charging, or an onboard fuel cell system for electric vehicle acceleration or cold weather operation, may be used to power the dielectric heating system.

Example 8: In an example, dielectric heating of a textile-based fabric support may be used to enable fast charging, acceleration, and cold temperature operation of electric vehicles. A solid electrolyte may include a ceramic-polymer composite composed of a ceramic ionic conductor such as NASICON-type LAGP and an ionic conducting polymer such as polyacrylonitrile (PAN). The ceramic-polymer composite may be supported on a textile-based fabric support, wherein the fibers of the fabric support are composed of poly(methyl methacrylate) (PMMA). An electromagnetic wave is applied to the positive and negative current collectors generating an electromagnetic field or wave across the solid-state battery. The electromagnetic wave is initiated by either electric vehicle charging, acceleration, cold weather activation, or a combination thereof. The electromagnetic wave generates heat inside the PMMA fibers heating the solid electrolyte. An external power source, such as a charging station for electric vehicle charging, or an onboard supercapacitor system for electric vehicle acceleration or cold weather operation, may be used to power the dielectric heating system.

Example 9: In an example, dielectric heating of the polymer binder in a ceramic-polymer composite electrolyte may be used to enable fast charging, acceleration, and cold temperature operation of electric vehicles. A solid electrolyte may include a ceramic-polymer composite composed of a ceramic ionic conductor such as a perovskite-type oxide and an ionic conducting polymer such as poly(ethylene oxide) (PEO). The ceramic-polymer composite may be supported on a textile-based fabric support such as fiber glass. An electromagnetic wave is applied to the positive and negative current collectors generating an electromagnetic field or wave across the solid-state battery. The electromagnetic wave is initiated by either electric vehicle charging, acceleration, cold weather activation, or a combination thereof. The electromagnetic wave generates heat inside the PEO heating the entirety of the solid electrolyte. An external power source, such as a charging station for electric vehicle charging, or an internal power source such as the solid-state battery themselves, for electric vehicle acceleration or cold weather operation, may be used to power the dielectric heating system.

The above described systems and methods can be ascribed to the fabrication of liquid, gel, or solid electrolytes with an internal heating element suspended or embedded within for all secondary battery systems.

The above described systems and methods can be ascribed for different battery configurations, such as coin cells, cylindrical cells, pouch cells or any other types of cells to serve different applications.

The above described system and methods can be ascribed for all solid-state batteries, or liquid based solid-state batteries such as, for example, hybrid or semi solid-state batteries, as well as gel or liquid based batteries.

The above described systems and methods can be ascribed for electric vehicles. Electric vehicles can be defined as either all electric vehicles, hybrid electric vehicles, or plug-in hybrid electric vehicles.

The above described systems and methods can be ascribed for all types of electric vehicles including, for example, sedan, coupe, convertible, hatchback, support utility, sports, compact, subcompact, minivan, van, luxury, truck, full size truck, pickup truck, economy, crossover, wagon, full-size, mid-size, bus, semi, etc.

The above described systems and methods can be ascribed for all types of autonomous electric vehicles including, for example, sedan, coupe, convertible, hatchback, support utility, sports, compact, subcompact, minivan, van, luxury, truck, full size truck, pickup truck, economy, crossover, wagon, full-size, mid-size, bus, semi, etc.

The above described systems and methods can be ascribed for alternative energy storage technologies in electric vehicles such as redox flow batteries, capacitors, supercapacitors, and fuel cells.

The following reference numbers are used in connection with the drawings: 002—Textile-based fabric support; 004—Solid electrolyte; 006—Ionic conductive ceramic; 008—Polymer matrix; 010—Wires or fibers embedded in the solid electrolyte matrix; 012—Elements or particles embedded in the solid electrolyte matrix; 014—Metal mesh-based fabric support; 016—Electric vehicle charging station; 018—Electrical pathway for battery charging; 020—Electrical pathway for internal heating from the battery charging pathway; 022—Electrical pathway for internal heating from the charging station; 024—Secondary electrical system; 026—Electrical circuit for resistive heating to the solid-state batteries; 028—Individual solid-state battery cells; 030—Solid-state battery module; 032—Solid-state battery pack; 034—Resistive heating leads; 036—Solid-state battery terminal; 038—Solid-state battery charging leads; 040—Solid-state battery charging circuit; 042—Electrical circuit for induction heating to the induction coils; 044—Induction coil; 046—Induction coil leads; 048—Electrical circuit to positive current collector for induction heating; 050—Electrical circuit to negative current collector for induction heating; 052—Positive current collector leads; 054—Negative current collector leads; 056—Accelerator; 058—Electric vehicle cabin floor; 060—Acceleration; 062—Idle angle; 064—Acceleration angle; 066—Accelerator sensor; 068—Electrical pathway for internal heating input signal; 070—Accelerator depressed; 072—Temperature sensor; 074—Temperature relay; 076—Temperature falls below threshold; 078—Temperature sensor activated; 080—Temperature relay tripped; 082—Electrical pathway for internal heating input signal from temperature sensor in the open position; 084—Electrical pathway for internal heating input signal from temperature sensor in the closed position; 086—Solid anode current collector layer; 088—Solid anode active material layer; 090—Solid electrolyte layer; 092—Solid cathode active material layer; 094—Solid cathode current collector layer; 096—Fabric Support or Heatable Material; and 098—Charging port.

Various aspects are represented below by the following clauses. The present application is not limited to the aspects represented in these clauses. Rather, the present description includes these aspects in combination with any one or more additional features described above or illustrated in the drawings.

The present disclosure includes, for example:

Clause 1. An inductively heatable battery, comprising: an anode; a cathode; an electrolyte; at least one inductively heatable material in the electrolyte.

Clause 2. The inductively heatable battery of clause 1, wherein the anode comprises a composite anode.

Clause 3. The inductively heatable battery of any one of the preceding clauses, wherein the anode comprises a metal or metal alloy anode.

Clause 4. The inductively heatable battery of any one of the preceding clauses, wherein the anode comprises a metal or metal alloy anode coated with a protective surface layer.

Clause 5. The inductively heatable battery of any one of the preceding clauses, wherein the cathode comprises a composite cathode.

Clause 6. The inductively heatable battery of any one of the preceding clauses, wherein the electrolyte comprises a liquid electrolyte.

Clause 7. The inductively heatable battery of any one of the preceding clauses, wherein the electrolyte comprises a gel polymer electrolyte.

Clause 8. The inductively heatable battery of any one of the preceding clauses, wherein the electrolyte comprises a solid electrolyte.

Clause 9. The inductively heatable battery of any one of the preceding clauses, wherein the electrolyte comprises a solid ionic conductive polymer.

Clause 10. The inductively heatable battery of any one of the preceding clauses, wherein the electrolyte comprises a solid ionic conductive ceramic.

Clause 11. The inductively heatable battery of any one of the preceding clauses, wherein the electrolyte comprises an ionic conductive salt.

Clause 12. The inductively heatable battery of clause 1, wherein the at least one inductively heatable material comprises at least one of iron, steel, nickel, zinc, cobalt, aluminum, copper, silicon, carbon, neodymium, manganese, ferrite, magnetite ($Fe_3O_4$), brass, silicon carbide, $Co_2Ba_2Fe_{12}O_{22}$, $SrFe_{12}O_{19}$, and combinations thereof.

Clause 13. The inductively heatable battery of any one of the preceding clauses, wherein the at least one inductively heatable material is coated with an electrically insulative material.

Clause 14. The inductively heatable battery of any one of the preceding clauses, wherein the at least one inductively heatable material is conformally coated with an electrically insulative material.

Clause 15. The inductively heatable battery of any one of the preceding clauses, wherein the at least one inductively heatable material is coated with an electrically insulative material, wherein the electrically insulative coating has a thickness in a range of from $1<t<3000$ nm, preferably in a range of from $5<t<100$ nm.

Clause 16. The inductively heatable battery of any one of the preceding clauses, wherein the electrically insulative coating has an electronic conductivity value of less than $10^{-6}$ S cm$^{-1}$, preferred values of $10^{-9}$ S cm$^{-1}$ or less.

Clause 17. The inductively heatable battery of any one of the preceding clauses, wherein at least one inductively heatable material comprises a metal mesh.

Clause 18. The inductively heatable battery of any one of the preceding clauses, wherein the at least one inductively heatable material comprises at least one inductively heatable wire or fiber.

Clause 19. The inductively heatable battery of any one of the preceding clauses, wherein the at least one inductively heatable material comprises at least one inductively heatable wire or fiber, wherein the at least one inductively heatable wire or fiber comprises at least one of a nanowire, a nanofiber, a microwire, a microfiber, a nanotube, a microtube, and combinations thereof.

Clause 20. The inductively heatable battery of any one of the preceding clauses, wherein the at least one inductively heatable material includes one or more inductively heatable particles.

Clause 21. The inductively heatable battery of any one of the preceding clauses, wherein the at least one inductively heatable material includes one or more inductively heatable particles, wherein the one or more inductively heatable particles includes at least one of quantum dots, nano dots, powder, micro particles, flakes, and combinations thereof.

Clause 22. The inductively heatable battery of any one of the preceding clauses, wherein the at least one inductively heatable material includes one or more inductively heatable particles having a particle size in a range of from $0<s<100$ preferably in a range from $0<s<1$ μm.

Clause 23. The inductively heatable battery of any one of the preceding clauses, wherein the at least one inductively heatable material is coated with a surfactant for dispersion in a liquid electrolyte.

Clause 24. The inductively heatable battery of any one of the preceding clauses, wherein the at least one inductively heatable material includes one or more inductively heatable particles within a fabric support, wherein the electrolyte is on the fabric support.

Clause 25. The inductively heatable battery of any one of the preceding clauses, wherein the at least one heatable material includes one or more inductively heatable particles on a fabric support, wherein the electrolyte is on the fabric support.

Clause 26. The inductively heatable battery of any one of the preceding clauses, wherein the at least one heatable material includes one or more inductively heatable particles deposited onto the surface of a porous battery separator.

Clause 27. The inductively heatable battery of any one of the preceding clauses, wherein the as least one heatable material includes one or more inductively heatable particles formed into the matrix of a porous battery separator.

Clause 28. An inductively heatable battery system, comprising: an inductively heatable battery; and an inductive coil proximate to the inductively heatable battery.

Clause 29. The inductively heatable battery system of Clause 28, wherein the inductively heatable battery is the inductively heatable battery of any one of the preceding clauses.

Clause 30. A vehicle, comprising: the inductively heatable battery system of any one of the preceding claims.

Clause 31. An inductively heatable battery method, comprising inductively heating an inductively heatable battery.

Clause 32. The inductively heatable battery method of Clause 31, wherein the inductively heatable battery is the inductively heatable battery of any one of the preceding clauses.

The present disclosure includes, for example:

Clause 1. A dielectrically heatable battery, comprising: an anode; a cathode; an electrolyte; at least one dielectrically heatable material in the electrolyte.

Clause 2. The dielectrically heatable battery of clause 1, wherein the anode comprises a composite anode.

Clause 3. The dielectrically heatable battery of any one of the preceding clauses, wherein the anode comprises a metal or metal alloy anode.

Clause 4. The dielectrically heatable battery of any one of the preceding clauses, wherein the anode comprises a metal or metal alloy anode coated with a protective surface layer.

Clause 5. The dielectrically heatable battery of any one of the preceding clauses, wherein the cathode comprises a composite cathode.

Clause 6. The dielectrically heatable battery of any one of the preceding clauses, wherein the electrolyte comprises a liquid electrolyte.

Clause 7. The dielectrically heatable battery of any one of the preceding clauses, wherein the electrolyte comprises a gel polymer electrolyte.

Clause 8. The dielectrically heatable battery of any one of the preceding clauses, wherein the electrolyte comprises a solid electrolyte.

Clause 9. The dielectrically heatable battery of any one of the preceding clauses, wherein the electrolyte comprises a solid ionic conductive polymer.

Clause 10. The dielectrically heatable battery of any one of the preceding clauses, wherein the electrolyte comprises a solid ionic conductive ceramic.

Clause 11. The dielectrically heatable battery of any one of the preceding clauses, wherein the electrolyte comprises an ionic conductive salt.

Clause 12. The dielectrically heatable battery of clause 1, wherein the at least one dielectrically heatable material comprises at least one of a polymer, an inorganic compound, an organic-inorganic composite, and combinations thereof.

Clause 13. The dielectrically heatable battery of any one of the preceding clauses, wherein at least one dielectrically heatable material comprises a textile-based fabric.

Clause 14. The dielectrically heatable battery of any one of the preceding clauses, wherein the at least one dielectrically heatable material comprises at least one dielectrically heatable wire or fiber.

Clause 15. The dielectrically heatable battery of any one of the preceding clauses, wherein the at least one dielectrically heatable material comprises at least one dielectrically heatable wire or fiber, wherein the at least one dielectrically heatable wire or fiber comprises at least one of a nanowire, a nanofiber, a microwire, a microfiber, a nanotube, a microtube, and combinations thereof.

Clause 16. The dielectrically heatable battery of any one of the preceding clauses, wherein the at least one dielectrically heatable material includes one or more dielectrically heatable particles.

Clause 17. The dielectrically heatable battery of any one of the preceding clauses, wherein the at least one dielectrically heatable material includes one or more dielectrically heatable particles, wherein the one or more dielectrically heatable particles includes at least one of quantum dots, nano dots, powder, micro particles, flakes, and combinations thereof.

Clause 18. The dielectrically heatable battery of any one of the preceding clauses, wherein the at least one dielectrically heatable material includes one or more dielectrically heatable particles having a particle size in a range of from $0<s<100$ μm, preferably in a range from $0<s<1$ μm.

Clause 19. The dielectrically heatable battery of any one of the preceding clauses, wherein the at least one dielectrically heatable material is coated with a surfactant for dispersion in a liquid electrolyte.

Clause 20. The dielectrically heatable battery of any one of the preceding clauses, wherein the at least one dielectrically heatable material includes one or more dielectrically heatable particles within a fabric support, wherein the electrolyte is on the fabric support.

Clause 21. The dielectrically heatable battery of any one of the preceding clauses, wherein the at least one dielectrically heatable material includes one or more dielectrically heatable particles on a fabric support, wherein the electrolyte is on the fabric support.

Clause 22. The dielectrically heatable battery of any one of the preceding clauses, wherein the at least one heatable material includes one or more dielectrically heatable particles deposited onto the surface of a porous battery separator.

Clause 23. The dielectrically heatable battery of any one of the preceding clauses, wherein the as least one heatable material includes one or more dielectrically heatable particles formed into the matrix of a porous battery separator.

Clause 24. The dielectrically heatable battery of any one of the preceding clauses, wherein the porous battery separator is the dielectrically heatable material.

Clause 25. A dielectrically heatable battery system, comprising: a dielectrically heatable battery; and a dielectric heater proximate to the dielectrically heatable battery.

Clause 26. The dielectrically heatable battery system of Clause 25, wherein the dielectrically heatable battery is the dielectrically heatable battery of any one of the preceding clauses.

Clause 27. The dielectrically heatable battery system of Clause 25, wherein the dielectrically heatable battery comprises an anode; a cathode; and a dielectrically heatable electrolyte.

Clause 28. A vehicle, comprising: the dielectrically heatable battery system of any one of the preceding claims.

Clause 29. A dielectrically heatable battery method, comprising dielectrically heating a dielectrically heatable battery.

Clause 30. The dielectrically heatable battery method of Clause 29, wherein the dielectrically heatable battery is the dielectrically heatable battery of any one of the preceding clauses.

Clause 31. The dielectrically heatable battery method of Clause 29, wherein the dielectrically heatable battery comprises an anode; a cathode; and a dielectrically heatable electrolyte.

The present disclosure includes, for example:

Clause 1. A resistively heatable battery, comprising: an anode; a cathode; a solid electrolyte; at least one resistively heatable material in the solid electrolyte; and an electrically, ionically, or electrically and ionically insulative coating on the at least one resistively heatable material.

Clause 2. The resistively heatable battery of clause 1, wherein the anode comprises a composite anode.

Clause 3. The resistively heatable battery of any one of the preceding clauses, wherein the anode comprises a metal or metal alloy anode.

Clause 4. The resistively heatable battery of any one of the preceding clauses, wherein the anode comprises a metal or metal alloy anode coated with a protective surface layer.

Clause 5. The resistively heatable battery of any one of the preceding clauses, wherein the cathode comprises a composite cathode.

Clause 6. The resistively heatable battery of any one of the preceding clauses, wherein the electrolyte comprises a solid ionic conductive polymer.

Clause 7. The resistively heatable battery of any one of the preceding clauses, wherein the electrolyte comprises a solid ionic conductive ceramic.

Clause 8. The resistively heatable battery of any one of the preceding clauses, wherein the electrolyte comprises an ionic conductive salt.

Clause 9. The resistively heatable battery of clause 1, wherein the at least one resistively heatable material comprises at least one of carbon, carbon nanotubes, carbon fibers, copper, stainless steel, aluminum, gold, silver, calcium, tungsten, zinc, nickel, iron, platinum, tin, lead, titanium, Manganin, Constantan, Nichrome, gallium arsenide, germanium, lithium, silicon, silicon nitride, aluminum nitride, molybdenum, and combinations thereof.

Clause 10. The resistively heatable battery of any one of the preceding clauses, wherein the at least one resistively heatable material is conformally coated with the electrically, ionically, or electrically and ionically insulative material.

Clause 11. The resistively heatable battery of any one of the preceding clauses, wherein the electrically, ionically, or electrically and ionically insulative coating has a thickness in a range of from $1<t<3000$ nm, preferably in a range of from $5<t<100$ nm.

Clause 12. The resistively heatable battery of any one of the preceding clauses, wherein the electrically, ionically, or electrically and ionically insulative coating has electronic conductivity and/or ionic conductivity values of less than $10^{-6}$ S $cm^{-1}$, with preferred values of $10^{-9}$ S $cm^{-1}$ or less.

Clause 13. The resistively heatable battery of any one of the preceding clauses, wherein at least one resistively heatable material comprises a metal mesh.

Clause 14. The resistively heatable battery of any one of the preceding clauses, wherein the at least one resistively heatable material comprises at least one resistively heatable wire or fiber.

Clause 15. The resistively heatable battery of any one of the preceding clauses, further comprising a liquid electrolyte to form a hybrid or semi-solid-state battery.

Clause 16. A resistively heatable battery system, comprising: a resistively heatable battery of any one of the preceding clauses; and a resistive heater proximate to the resistively heatable battery.

Clause 17. The resistively heatable battery system of Clause 16, wherein the resistively heatable battery is the resistively heatable battery of any one of the preceding clauses.

Clause 18. A vehicle, comprising: the resistively heatable battery system of any one of the preceding claims.

Clause 19. A resistively heatable battery method, comprising resistively heating a resistively heatable battery, wherein the resistively heatable battery is the resistively heatable battery of any one of the preceding clauses.

The invention claimed is:

1. A vehicle comprising:

a battery comprising an anode; a cathode; a solid electrolyte; and at least one of:

an inductively heatable material embedded in the solid electrolyte;

a dielectrically heatable material embedded in the solid electrolyte; and a resistively heatable material embedded in the solid electrolyte, wherein an electronically, ionically, or electronically and ionically insulative coating is on the resistively heatable material;

a charging port configured to connect with an external charging station;

a charging electrical circuit pathway, wherein the battery is connected to the charging port via the charging pathway, whereby the battery can be charged through the charging port; and a secondary electrical system comprising: a heating electrical circuit pathway and an inductive heater configured to inductively heat the inductively heatable material embedded in the solid electrolyte, a dielectric heater configured to dielectrically heat the dielectrically heatable material embedded in the solid electrolyte, or a resistive heater configured to resistively heat the resistively heatable material embedded in the solid electrolyte.

2. The vehicle of claim 1, wherein the battery is connected to a motor for accelerating the vehicle.

3. The vehicle of claim 1, wherein the secondary electrical system is connected to the charging port for powering the inductive heater, dielectric heater, or resistive heater.

4. The vehicle of claim 1, wherein the secondary electrical system is connected to the battery for powering the inductive heater, dielectric heater, or resistive heater.

5. The vehicle of claim 1, wherein the secondary electrical system is connected to a backup power source for powering the inductive heater, dielectric heater, or resistive heater.

6. The vehicle of claim 1, wherein the vehicle comprises an accelerator, wherein the secondary electrical system is connected to the accelerator, wherein heating of the inductively, dielectrically, or resistively heatable material embedded in the solid electrolyte is induced by the accelerator pedal.

7. The vehicle of claim 1, wherein the vehicle comprises a temperature sensor, wherein the secondary electrical system is connected to the temperature sensor, wherein heating of the inductively, dielectrically, or resistively heatable material embedded in the solid electrolyte is induced by the temperature sensor.

8. The vehicle of claim 1, wherein the battery comprises the inductively heatable material embedded in the solid electrolyte, and wherein the secondary electrical system comprises the inductive heater configured to inductively heat the inductively heatable material embedded in the solid electrolyte, wherein the inductive heater comprises an induction coil connected to the heating electrical circuit pathway and positioned to inductively heat the inductively heatable material embedded in the solid electrolyte.

9. The vehicle of claim 8, wherein the inductively heatable material comprises a metal mesh.

10. The vehicle of claim 8, wherein the inductively heatable material comprises a plurality of inductively heatable materials embedded in the solid electrolyte.

11. The vehicle of claim 1, wherein the battery comprises the dielectrically heatable material embedded in the solid electrolyte, and wherein the secondary electrical system comprises the dielectric heater configured to dielectrically heat the dielectrically heatable material embedded in the solid electrolyte, wherein the dielectric heater comprises an electromagnetic wave generator connected to the heating electrical circuit pathway and electrically connected to a current collector of the battery to dielectrically heat the dielectrically heatable material embedded in the solid electrolyte.

12. The vehicle of claim 11, wherein the dielectrically heatable material comprises a plurality of dielectrically heatable materials.

13. The vehicle of claim 11, wherein the dielectrically heatable material comprises a porous battery separator or one or more dielectrically heatable particles deposited onto or formed within a porous battery separator.

14. The vehicle of claim 1, wherein the battery comprises the resistively heatable material embedded in the solid electrolyte, and wherein the secondary electrical system comprises the resistive heater configured to resistively heat the resistively heatable material embedded in the solid electrolyte, wherein the resistive heater comprises resistive heating leads electrically connected to the heating electrical circuit pathway and electrically connected to the resistively heatable material embedded in the solid electrolyte.

15. The vehicle of claim 14, wherein at least one resistively heatable material comprises a metal mesh.

16. The vehicle of claim 15, wherein the electronically, ionically, or electronically and ionically insulative coating has a thickness in a range of from $1<t<3000$ nm.

17. The vehicle of claim 15, wherein the electronically, ionically, or electronically and ionically insulative coating has electronic conductivity and/or ionic conductivity values of less than $10^{-6}$ S $cm^{-1}$.

* * * * *